(12) United States Patent
Lux et al.

(10) Patent No.: US 11,007,589 B2
(45) Date of Patent: May 18, 2021

(54) FILE FOR FILING THE CUTTING TOOTH OF A SAW CHAIN

(71) Applicant: Andreas Stihl AG & Co. KG, Waiblingen (DE)

(72) Inventors: Thomas Lux, Alfdorf (DE); Friedrich Hollmeier, Rudersberg (DE); Georg Maier, Kernen (DE); Bertil Stapel, Schorndorf (DE); Tobias Grams, Waiblingen (DE); Norbert Althoff, Lindlar (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 16/588,636

(22) Filed: Sep. 30, 2019

(65) Prior Publication Data

US 2020/0030898 A1    Jan. 30, 2020

Related U.S. Application Data

(63) Continuation-in-part of application No. 15/959,103, filed on Apr. 20, 2018, now Pat. No. 10,456,946.

(30) Foreign Application Priority Data

Apr. 20, 2017   (EP) .................................... 17400020

(51) Int. Cl.
*B23D 63/16* (2006.01)
(52) U.S. Cl.
CPC .................. *B23D 63/162* (2013.01)

(58) Field of Classification Search
CPC ...... B23D 63/162; B23D 71/04; B27B 33/142
USPC .................................................... 83/834, 830
See application file for complete search history.

(56) References Cited

U.S. PATENT DOCUMENTS

| | | | | |
|---|---|---|---|---|
| 295,487 | A * | 3/1884 | Custer | B23D 71/00 407/29.1 |
| 1,906,881 | A * | 5/1933 | Olas | B23D 63/10 76/36 |
| 3,144,891 | A * | 8/1964 | Carlton | B27B 33/142 83/834 |
| 3,339,254 | A * | 9/1967 | Anderson | B23D 63/162 76/80.5 |
| 3,469,610 | A * | 9/1969 | Silvon | B23D 63/162 83/831 |
| 3,581,785 | A * | 6/1971 | Neumeier | B27B 33/142 83/830 |
| 3,696,692 | A * | 10/1972 | Baranowski | B23D 65/00 76/112 |

(Continued)

FOREIGN PATENT DOCUMENTS

| | | |
|---|---|---|
| CA | 2054617 A1 | 5/1993 |
| CH | 219984 A | 3/1942 |

(Continued)

*Primary Examiner* — Sean M Michalski
(74) *Attorney, Agent, or Firm* — Walter Ottesen, P.A.

(57) ABSTRACT

The disclosure relates to a file for filing a saw tooth of a saw chain. The file includes a file body defining a circumferential direction and a circumference. The file body, in a cross section, has an unhewn guide surface and a file surface adjoining the unhewn guide surface in the circumferential direction. The unhewn guide surface extends over at least ⅙ of the circumference in the cross section.

17 Claims, 15 Drawing Sheets

(56) References Cited

U.S. PATENT DOCUMENTS

| | | | | |
|---|---|---|---|---|
| 3,727,507 A | * | 4/1973 | Weiss | B27B 33/142 83/831 |
| 3,856,358 A | * | 12/1974 | Krekeler | B27B 33/14 299/82.1 |
| 4,008,640 A | * | 2/1977 | Good | B27B 33/14 83/833 |
| 4,122,741 A | * | 10/1978 | Engman | B27B 33/142 83/830 |
| 4,211,136 A | * | 7/1980 | Geurian | B27B 33/14 83/830 |
| 4,271,738 A | * | 6/1981 | DeAngelis | B23D 57/02 83/174 |
| 4,325,168 A | * | 4/1982 | Swentzel | B23D 63/162 76/80.5 |
| 4,348,926 A | * | 9/1982 | Dolata | B27B 33/142 76/80.5 |
| 4,463,630 A | * | 8/1984 | Turner | B23D 63/166 76/41 |
| 4,473,958 A | * | 10/1984 | Atkinson | B23D 63/162 33/202 |
| 4,530,258 A | * | 7/1985 | Gibson | B27B 33/142 76/80.5 |
| 4,535,654 A | * | 8/1985 | White | B23D 63/162 33/202 |
| 4,535,667 A | * | 8/1985 | Gibson | B23D 63/168 76/80.5 |
| 4,562,762 A | * | 1/1986 | Dubler | B23D 65/00 83/734 |
| 4,567,792 A | * | 2/1986 | Baldwin | B23D 63/162 76/36 |
| 4,567,803 A | * | 2/1986 | Anderson | B27B 33/141 83/833 |
| 4,584,745 A | * | 4/1986 | Seiber | B23D 71/04 407/29.1 |
| 4,587,868 A | * | 5/1986 | Kuwica | B23D 63/162 407/29.15 |
| 4,625,610 A | * | 12/1986 | Petrovich | B27B 33/141 83/833 |
| 4,785,700 A | | 11/1988 | Petrovich et al. | |
| 4,898,057 A | * | 2/1990 | Hille | B27B 33/14 83/831 |
| 5,065,658 A | * | 11/1991 | Ziegelmeyer | B27B 33/142 83/834 |
| 5,172,619 A | * | 12/1992 | Kolve | B27B 33/142 83/13 |
| 5,210,895 A | * | 5/1993 | Hull | B23D 71/04 7/165 |
| D360,121 S | * | 7/1995 | Anderson | D8/90 |
| D360,569 S | * | 7/1995 | Anderson | D8/90 |
| 5,666,871 A | * | 9/1997 | Burrows | B23D 61/021 83/830 |
| 6,112,632 A | * | 9/2000 | Buchholtz | B27B 33/141 83/830 |
| 6,308,606 B1 | * | 10/2001 | Buchholtz | B27B 33/14 83/830 |
| 6,435,070 B1 | * | 8/2002 | Weber | B23D 63/168 83/830 |
| 7,617,621 B1 | * | 11/2009 | Schwede | B27B 33/142 37/465 |
| D656,380 S | * | 3/2012 | DeLeon | D8/90 |
| 8,256,335 B1 | * | 9/2012 | Canon | B27B 33/14 83/832 |
| 8,291,790 B2 | * | 10/2012 | Schlimbach | B23D 63/162 76/80.5 |
| D670,990 S | * | 11/2012 | Kruse | D8/91 |
| 9,272,440 B1 | * | 3/2016 | Hutsell | B27B 33/142 |
| 2003/0126952 A1 | * | 7/2003 | Duquet | B27B 33/145 76/112 |
| 2003/0192418 A1 | * | 10/2003 | Mang | B27B 33/141 83/833 |
| 2008/0034938 A1 | * | 2/2008 | Fuchs | B27B 33/147 83/830 |
| 2008/0072733 A1 | * | 3/2008 | Schulz | B27B 33/141 83/834 |
| 2008/0110316 A1 | * | 5/2008 | Harfst | B27B 33/142 83/830 |
| 2009/0107317 A1 | * | 4/2009 | Kewes | B27B 33/142 83/831 |
| 2010/0005666 A1 | * | 1/2010 | Seigneur | B23D 63/168 30/138 |
| 2011/0179652 A1 | * | 7/2011 | Fohrenbach | B27B 33/141 30/383 |
| 2014/0123827 A1 | * | 5/2014 | Fuchs | B23D 65/00 83/830 |
| 2014/0260875 A1 | * | 9/2014 | Harfst | B27B 33/14 83/830 |
| 2015/0122102 A1 | * | 5/2015 | Engelfried | B23D 65/02 83/788 |
| 2015/0183124 A1 | * | 7/2015 | Schell | B27B 33/141 83/834 |
| 2016/0045964 A1 | * | 2/2016 | Likidou | B23D 65/00 30/383 |
| 2016/0121511 A1 | * | 5/2016 | Hutsell | B27B 33/141 83/834 |
| 2016/0136837 A1 | * | 5/2016 | Szymanski | B27B 33/14 83/830 |
| 2018/0304490 A1 | | 10/2018 | Lux et al. | |

FOREIGN PATENT DOCUMENTS

| | | |
|---|---|---|
| EP | 0292241 A1 | 11/1988 |
| EP | 3392007 A1 | 10/2018 |
| JP | 2001-62804 A | 3/2001 |
| WO | 2012/143419 A1 | 10/2012 |

* cited by examiner

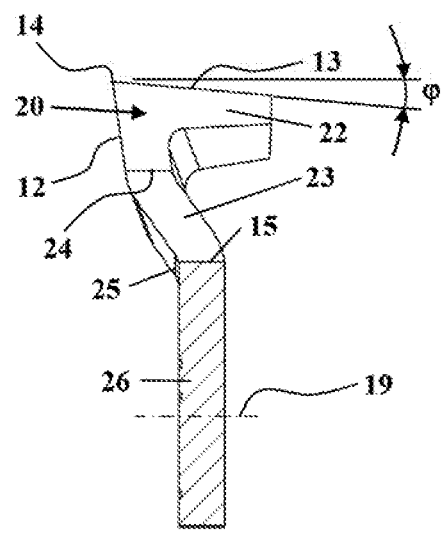
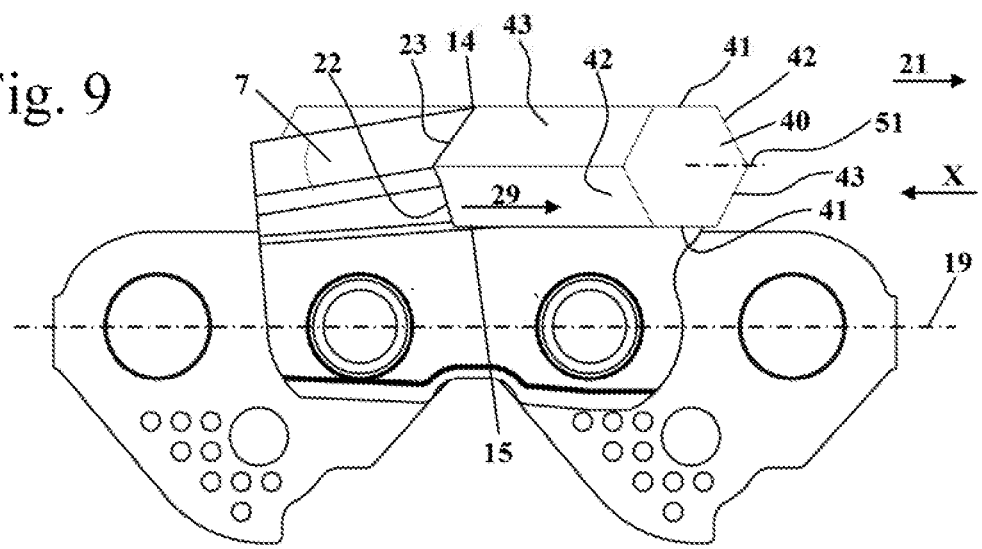
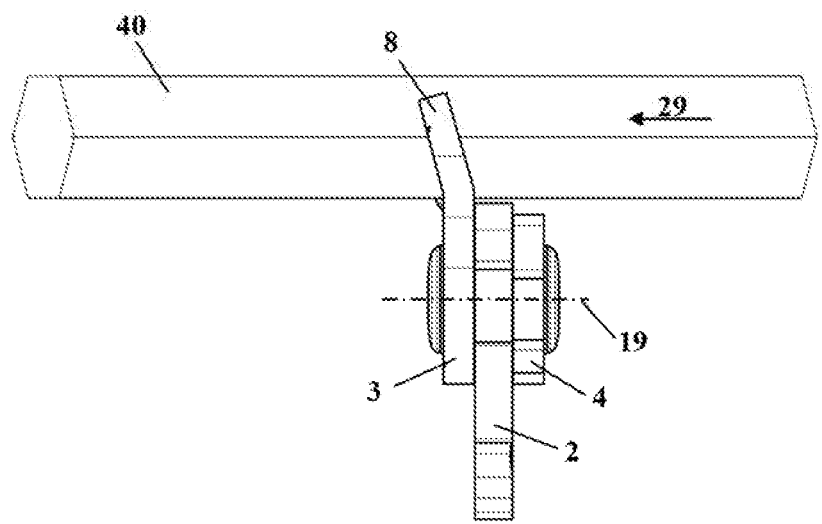

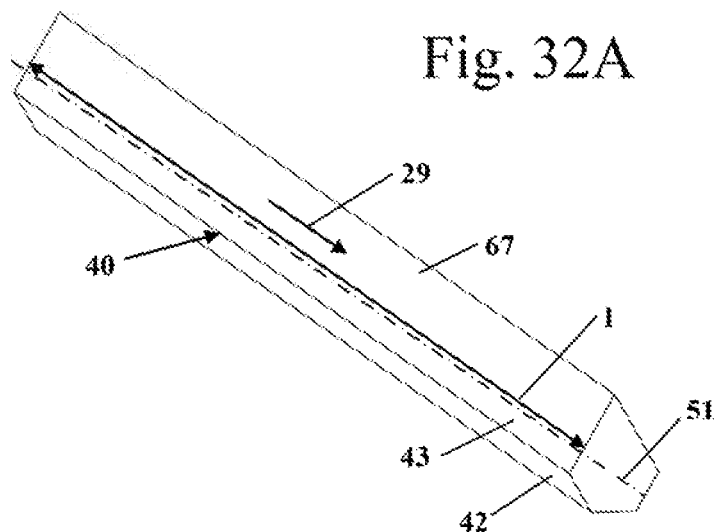 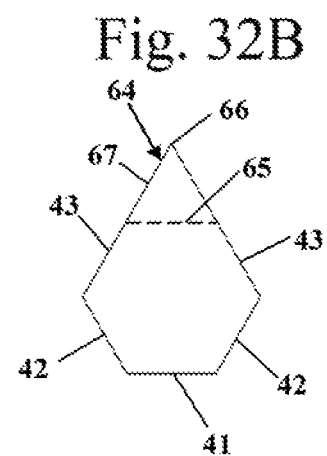
Fig. 32A  Fig. 32B
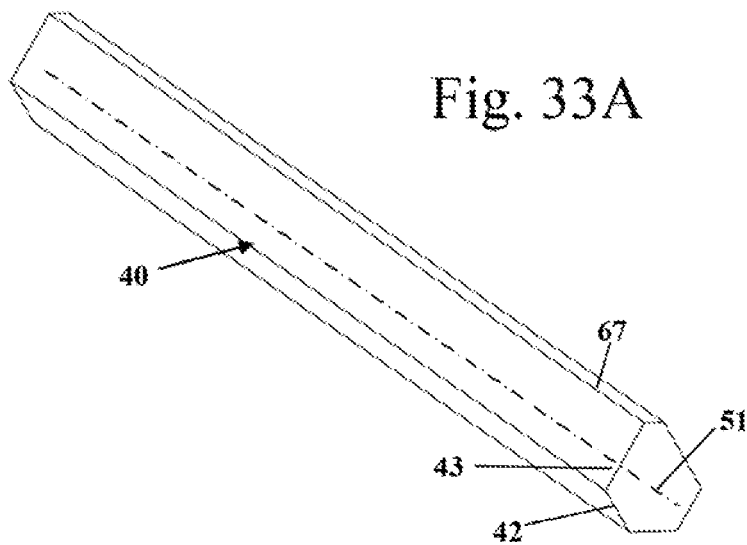 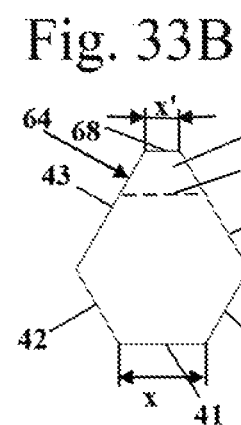
Fig. 33A  Fig. 33B
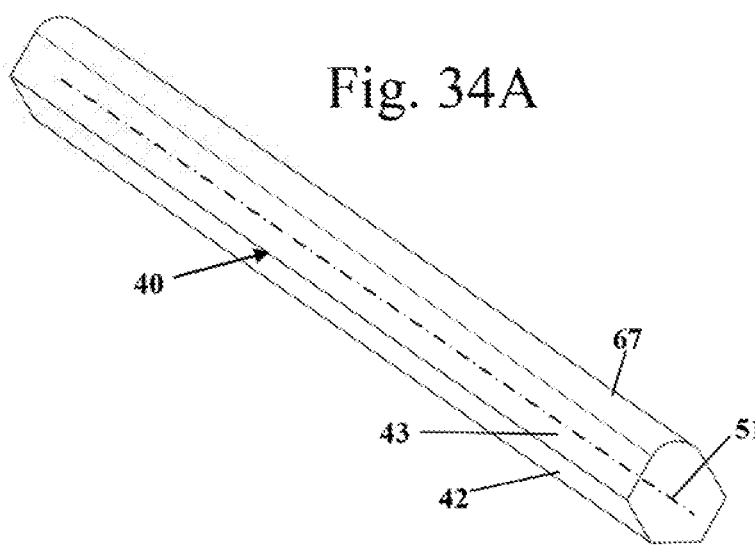 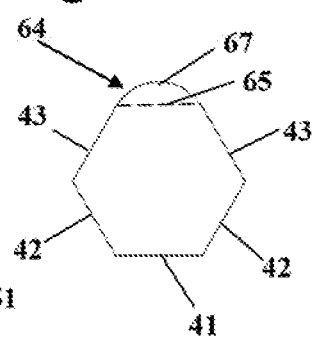
Fig. 34A  Fig. 34B

FILE FOR FILING THE CUTTING TOOTH OF A SAW CHAIN

CROSS REFERENCE TO RELATED APPLICATIONS

This application is a continuation-in-part application of patent application Ser. No. 15/959,103, filed Apr. 20, 2018, which, in turn, claims priority of European patent application no. 17 400 020.8, filed Apr. 20, 2017, the entire contents of both applications are incorporated herein by reference.

FIELD OF THE INVENTION

The invention relates to a file for filing the cutting tooth of a saw chain.

BACKGROUND OF THE INVENTION

CA 2,054,617 A1 discloses a cutting member of a saw chain which is to be re-sharpened using a grinding wheel. During resharpening there is a planar surface on a cutout between depth limiter and cutting tooth. The cutting surface formed on the cutting tooth has a cutting surface edge which in the resharpening state shown is arranged directly on the underside of the roof section of the cutting member. If the cutting tooth is re-sharpened further and at the same time the grinding wheel is moved parallel to the bearing position plane, the cutting surface edge creeps into the roof section.

If cutting members are re-sharpened by hand with a file, the operator must guide the file such that the cutting angle, that is, the angle about which the cutting surface on the roof section is inclined relative to the running direction, remains the same. At the same time, the operator must ensure when filing that he does not guide the file too far in the direction of the bearing position plane as this can result in weakening the cutting tooth in the region of the connection to the basic body of the cutting member. This is difficult in particular for inexperienced operators. In particular in the case of cutting members with a roof section which falls away to the rear, manual resharpening using a round file requires a good deal of skill as the file is to be guided not only in the horizontal direction but also in the vertical direction at the same time. Even small errors in the positioning of the round file give rise to a clear change in the cutting angle.

SUMMARY OF THE INVENTION

It is an object of the invention is to provide a file for filing the cutting tooth of a saw chain which allows simple resharpening.

This object can, for example, be achieved by a file for filing a saw tooth of a saw chain. The file includes: a file body defining a circumferential direction and a circumference; the file body, in a cross section, having an unhewn guide surface and a file surface adjoining the unhewn guide surface in the circumferential direction; and, the unhewn guide surface extending over at least ⅙ of the circumference in the cross section.

It is provided for a file for filing a cutting tooth of a saw chain that the file has in cross section an unhewn guide surface and at least one file surface which adjoins the guide surface in the circumferential direction. The file is able to be placed on the support surface with the unhewn guide surface. The file surface, which adjoins the guide surface, can advantageously be provided to abut against the cutting surface and to machine the cutting surface. As a result of the file surface directly adjoining the unhewn guide surface, and the guide surface itself being unhewn, it is possible to achieve in a simple manner that the support surface is lengthened during resharpening and its alignment in this case is maintained. As a result, simple and precise resharpening can be made possible even for an inexperienced user. The width of the file, measured parallel to the guide surface, is enlarged advantageously in at least one region of the cross section of the file as the distance from the guide surface increases. As a result, an undercut can be produced in a simple manner on the cutting surface without the region of the connection between the cutting tooth and the basic body of the cutting member being unduly weakened. In a preferred manner, the distance between the file surface and a center plane of the file, which includes the longitudinal center axis of the file and extends perpendicularly to the guide surface, is increased in a first region of the file as the distance from the guide surface increases. It is advantageously provided in a second region of the file, the distance of which from the guide surface is greater than the distance of the first region from the guide surface, that the distance between the file surface and the center plane of the file is reduced as the distance from the guide surface increases. As a result, an undercut is generated on the cutting surface by the first region and the second region of the file.

It is provided in particular for a cutting member which has two cutting surfaces which are aligned at an angle to one another and in a preferred manner extend in each case in a flat manner, that the file has a second file surface which adjoins the first file surface in the circumferential direction, the guide surface enclosing with the first file surface a first angle which is more than 90°, and the guide surface enclosing with the second file surface a second angle which is less than 90°. As a result, a comparatively wide connection between the cutting tooth and the basic body of the cutting member and at the same time an advantageous cutting angle can be achieved. In an advantageous manner, the first file surface forms the first region of the file and the second file surface forms the second region of the file.

It can advantageously be provided for a file for filing a cutting tooth with a curved cutting edge that the file has a curved file surface which adjoins the guide surface in the circumferential direction. The guide surface and the file surface of the file are advantageously formed by different circumferential sections of the file.

In an advantageous manner, the first file surface and the second file surface have the same edge dimension, measured in the circumferential direction. In a preferred configuration, the file has two unhewn guide surfaces which are located opposite one another, two first file surfaces which are located opposite one another and two second file surfaces which are located opposite one another. As a result, the file is able to be utilized for resharpening in at least two orientations. In a particularly preferred configuration, the file has a hexagonal cross section. The width of the guide surface is advantageously at least 3 mm. As a result, the file is guided well by the guide surface.

It has been found that, in files which have unhewn and smooth sides and in particular a regular cross section such as a hexagonal cross section, for example, it can be difficult for the operator to identify the correct orientation of the file. In order to make the at least one unhewn guide surface readily distinguishable visually and/or haptically from the at least one smooth file surface for the operator, it is provided that the file has an indication, which reveals the rotational position of the file about its longitudinal center axis. In a preferred configuration, the indication is arranged on the guide surface or on the opposite side of the file from the guide surface. For a correct orientation of the file, that is, for a correct rotational position of the file about its longitudinal center axis, the operator merely has to ensure that during filing the side of the file that has the indication is located on the top or—depending on the configuration of the file—on the bottom.

The file can have two guide surfaces, that is, be turnable. Here, provision can be made for only one of the two guide surfaces to have an indication or for both guide surfaces to have an indication. In the case of a file having two guide surfaces, the indication can be different for the two guide surfaces so that the operator can tell from the indication which of the guide surfaces is in contact with the support surface. In an alternative configuration, provision can also be made for the file to have only one guide surface, that is, not to be turnable.

Preferably, the indication can be formed by an irregular geometry of the file in at least one cross section. Particularly preferably, the cross section of the file differs from a regular hexagonal cross section in at least one cross section. In particular in the case of files having a regular hexagonal cross section, the orientation of the file is hard for the operator to discern. For files in which the file surfaces are curved and the at least one guide surface of which is formed in a straight manner in cross section, the position of the file surfaces and of the at least one guide surface is generally discernible by the operator without an additional indication.

Advantageously, the edge dimension of the side of the file located opposite the guide surface differs from the edge dimension of the guide surface. As a result, it is visually apparent to the operator whether the file is resting as desired on the guide surface or incorrectly on the side of the file located opposite the guide surface. Preferably, the edge dimension of the side of the file located opposite the guide surface is less than the edge dimension of the guide surface. The edge dimension of the side of the file located opposite the guide surface is preferably chosen such that it is not possible for the file to rest stably on this surface. Preferably, the edge dimension of the side of the file located opposite the guide surface is less than 3 mm.

Alternatively or additionally, it can be provided that the shape of the side of the file located opposite the guide surface differs in at least one cross section from a profile parallel to the guide surface. Such a profile that is not parallel to the guide surface is noticeable and visible to the operator, and so the operator can readily discern the position of the side located opposite the guide surface and thus also the position of the guide surface for example even under poor light conditions. Advantageously, the side of the file located opposite the guide surface has at least one elevation. The elevation is preferably realized such that it is not possible for the file to rest stably on the side located opposite the guide surface or such that the operator, when moving the file over the workpiece, notices if it rests on the side of the file located opposite the guide surface, for example in that the file clatters with respect to the workpiece. In an alternative or additional configuration, it is advantageously provided that the side of the file located opposite the guide surface has at least one recess.

Alternatively or additionally, provision can be made for the guide surface to be interrupted by at least one recess. The guide surface is understood in the present case to be that region of the side of the file to be placed on the support surface that can come into contact with the support surface during filing. At possible recesses, the planar guide surface is interrupted. Since it is necessary to ensure that the first file surface extends as far as the support surface, elevations of the support surface with respect to the lower edge of the first file surface are advantageously not provided.

The at least one elevation and the at least one recess can in this case extend continuously along the entire length of the first file surface of the file. The length of the first file surface corresponds in this case to the length of the longitudinal section of the file that is intended to engage with the cutting member. The file can have further longitudinal sections, for example a longitudinal section for connecting to a handle for the file or a longitudinal section for guiding the file, which is arranged at the free end of the file.

Alternatively, it can be provided that the at least one elevation or the at least one recess has interruptions in the longitudinal direction. In the region of the interruptions, the file preferably has a hexagonal cross section.

Advantageously, the elevation and/or the recess extend only over a part of the width of the side located opposite the guide surface. Advantageously, the side located opposite the guide surface also has, in one, in particular in every, cross section in which an elevation or recess is provided, a region which extends parallel to the guide surface. Preferably, the elevation or recess is arranged in cross section between two sections extending parallel to the guide surface. However, provision can also be made for the at least one elevation and/or the at least one recess to extend over the entire width of the side located opposite the guide surface or over the entire width of the guide surface. The width of the at least one elevation or of the at least one recess then corresponds to the edge dimension of the side located opposite the guide surface or to the edge dimension of the guide surface. The at least one elevation and/or recess can in this case extend in cross section over the entire width of the guide surface. Preferably, however, provision is made for the at least one elevation and/or recess to be inclined with respect to the longitudinal direction of the file and as a result for the position of the elevation and/or recess on the guide surface to change from cross section to cross section of the file.

In an advantageous configuration, the first file surface, the second file surface and the guide surface are realized in a straight manner in cross section. None of the surfaces accordingly has a bulge. In an alternative configuration, a concave bulge can be advantageous for the guide surface. As a result, the guide surface rests only on two longitudinal webs.

In order to provide the operator with feedback about the orientation of the at least one guide surface, that is, about the rotational position of the file about its longitudinal center axis, it can also be provided that the file has a first longitudinal section and a second longitudinal section and that the cross section in the second longitudinal section differs from the cross section in the first longitudinal section. The first longitudinal section is in this case preferably the longitudinal section of the file which has the first file surface, the second file surface and the guide surface and which is intended to come into contact with a cutting tooth. The second longitudinal section is preferably arranged between the first longitudinal section and a free end of the file. The free end of the file is in this case the end of the file that is remote from a handle for the file. The length of the second longitudinal section is advantageously much less than the length of the first longitudinal section.

Provision can be made for the file to have, in the second longitudinal section, a flattened cross section on at least one side compared to the cross section in the first longitudinal section. Preferably, the file is flattened on opposite sides in the second longitudinal section. Particularly preferably, the file is realized in a flattened manner on at least one guide surface in the second longitudinal section.

In an alternative configuration, it is advantageously provided that the file has, in the second longitudinal section, at least one, in particular two surfaces that are inclined with respect to the longitudinal direction. Accordingly, the file is formed in a chamfered manner at the surfaces that are inclined with respect to the longitudinal direction. Particularly preferably, two surfaces that are inclined with respect to the longitudinal direction converge at an edge. The edge preferably forms the free end of the file. Alternatively or additionally, provision can be made for the file to have a longitudinal slot in the second longitudinal section. Advantageously, the longitudinal slot is arranged parallel or perpendicularly to at least one guide surface. The longitudinal slot provides visual feedback about the position of the at least one guide surface. At the same time, the longitudinal slot makes it easier to hold on to the file, since grip is increased by the longitudinal slot.

BRIEF DESCRIPTION OF THE DRAWINGS

The invention will now be described with reference to the drawings wherein:

FIG. 8 shows a section along the line VIII-VIII in FIG. 6;

FIG. 9 shows a side view of the detail of the saw chain with a file arranged thereon;

FIG. 10 shows a side view in the direction of the arrow X in FIG. 9;

FIGS. 32A to 42B show schematic illustrations of further embodiments of files, a perspective illustration of the file being shown in each case in the figure designated "A" and a cross section of the file being shown in each case in the figure designated "B";

DESCRIPTION OF THE PREFERRED EMBODIMENTS OF THE INVENTION

Figure 1:
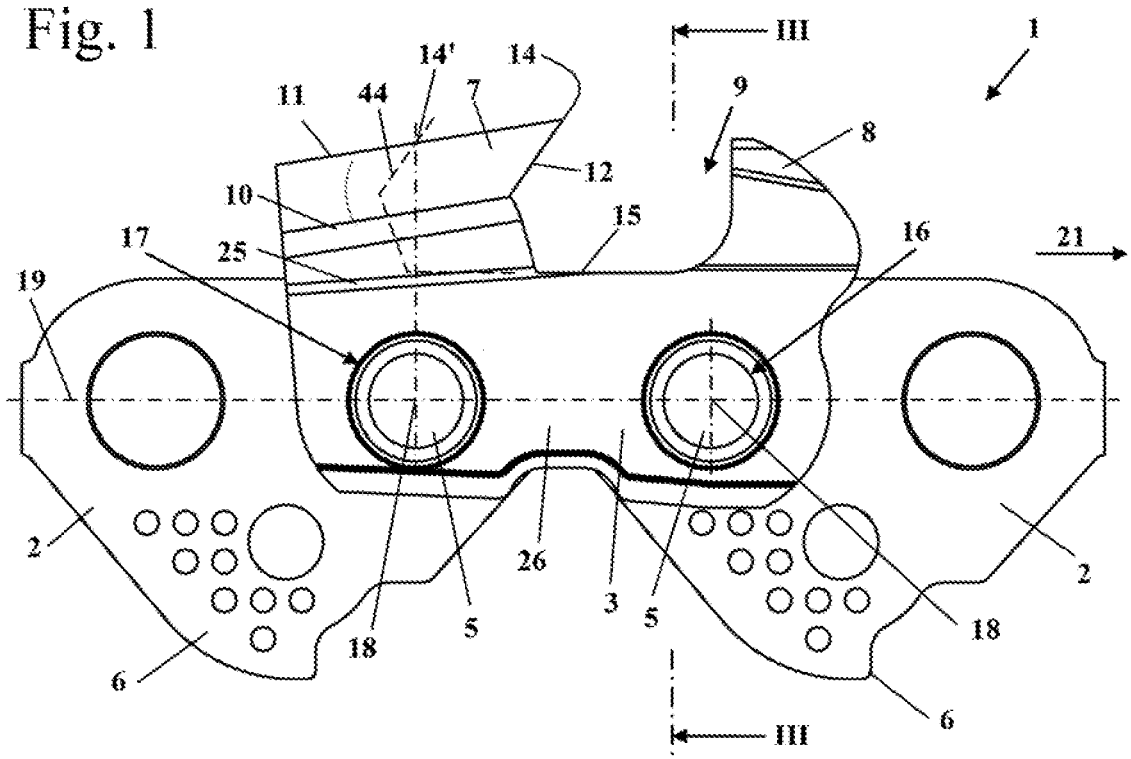
FIG. 1 and FIG. 2 show side views of a detail of a saw chain.

FIG. 1 shows a side view of a section of a saw chain 1. The saw chain 1 has drive links 2 and cutting members 3 which are connected together in an articulated manner via connecting pins 5. The saw chain 1 is provided as a tool for a power saw in which the saw chain 1 is to be arranged circulating around a guide rail. In this case, drive bases 6 of the drive links 2 project into a guide groove of the guide rail and are driven by a drive pinion of the power saw. The saw chain 1, in this case, is moved in a running direction 21 circulating around the guide rail. The connecting pins 5 are arranged at bearing points of the cutting member 3. A front bearing point 16, which is arranged at the front in the running direction 21, and a rear bearing point 17, which is located at the rear in the running direction 21, are provided. The bearing points 16 and 17 each have longitudinal center axes 18 which form the pivot axes of the members of the saw chain 1. The longitudinal center axes 18 span a bearing point plane 19. The bearing points 16 and 17 are realized in a basic body 26 of the cutting member 3. In a preferred manner, the basic body 26 is realized flat. A depth limiter 8 and a cutting tooth 7, which can rise out of the plane of the basic body 26, are arranged on the basic body 26. Both the depth limiter 8 and the cutting tooth 7 are bent up out of the basic body plane in the embodiment. A cutout 9 which is delimited by a support surface 15, which is described in more detail below, in the direction of the bearing point plane 19, is realized between the depth limiter 8 and the cutting tooth 7. The support surface 15 extends almost over the entire bottom of the cutout 9 in the embodiment according to FIG. 1.

Figure 3:
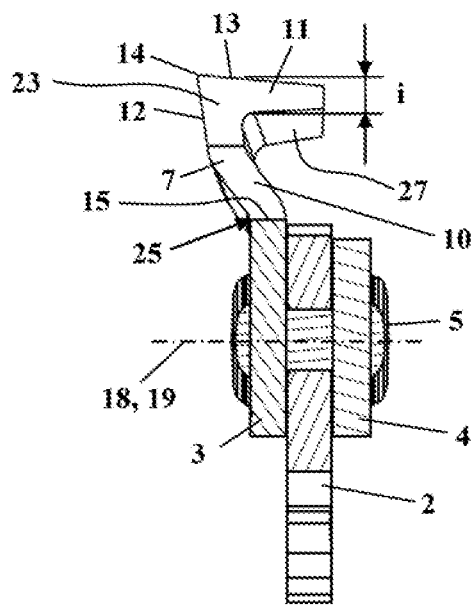
FIG. 3 shows a section along the line III-III in FIG. 1.

The cutting tooth 7 has a tooth root 25 which designates the region at which the cutting tooth 7 is connected to the basic body 26 of the cutting member 3. The cutting tooth 7 is bent up out of the plane of the basic body 26 at the tooth root 25. The cutting tooth 7 has a side section 10 at which the cutting tooth 7 extends approximately parallel to the plane of the basic body 26 at least in a section and a roof section 11 in which the cutting tooth 7 runs approximately parallel to the longitudinal center axes 18. The cutting tooth 7 is bent towards a center plane of the saw chain 1 at the roof section 11. As shown in FIG. 3, the roof section extends at least in part over the drive link 2 which is adjacent to the cutting member 3.

A first cutting edge 12 realized on the side section 10 and a tooth tip 14 of the cutting tooth 7, both of which are provided for engagement in a workpiece, can be seen in FIG. 1. The tooth tip 14, in this case, is the region of the cutting tooth 7 which is located the furthest forward in the running direction 21. The tooth tip 14 can also be realized in a rounded or curved manner.

Figure 2:
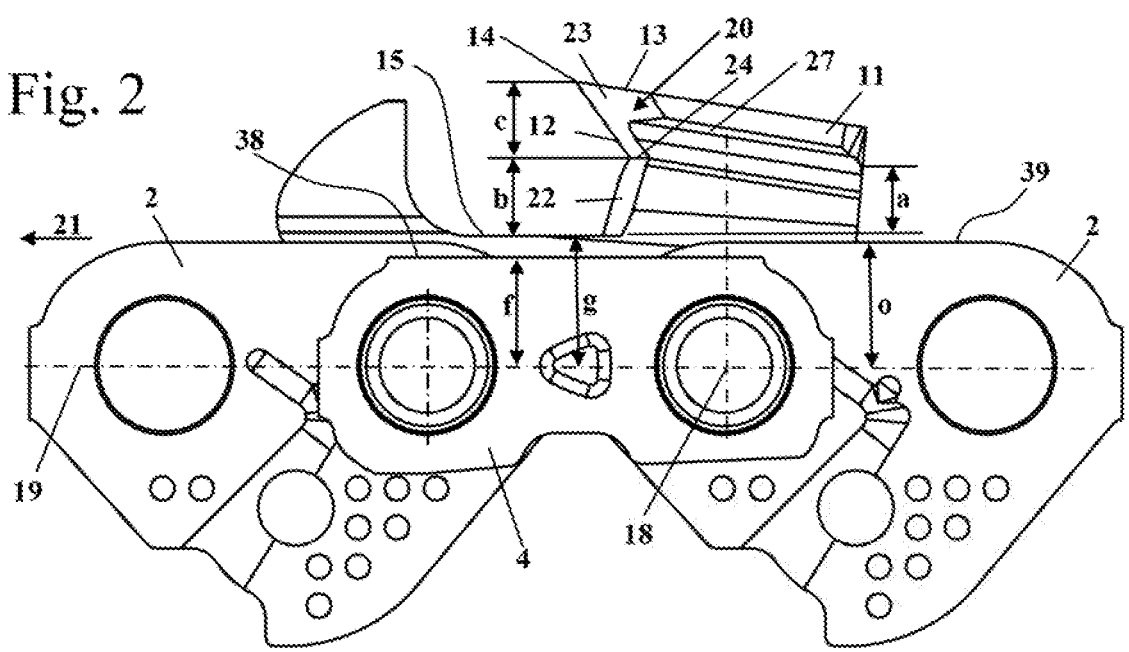

During resharpening of the cutting tooth 7, the operator places a file, which is supported on the cutting edge 12, onto the support surface 15 and guides the file along the support surface 15. FIG. 1 shows an imaginary displacement 44 of the cutting edge 12 where a tooth tip 14' lies perpendicularly above the longitudinal center axis 18 of the rear bearing point 17 with reference to the running direction 21. The imaginary displacement 44 corresponds to the contour of the cutting edge 12 in the side view shown when the cutting edge 12 is re-sharpened into the position shown. FIG. 1 and FIG. 2, in this case, show side views of the saw chain 1 in the viewing direction of the longitudinal center axes 18.

As shown in FIG. 2, a second cutting edge 13 is realized on the top side of the roof section 11 remote from the bearing point plane 18. The first cutting edge 12 and the second cutting edge 13 are edges of a cutting surface 20 which runs at an angle to the side view shown. The cutting surface 20 has a first cutting surface section 22 which directly adjoins the support surface 15 and a second cutting surface section 23 which extends on the roof section 11 and into the region of the side section 10 lying below it. The cutting edges 12 and 13 meet at the tooth tip 14.

The entire region between the support surface 15 and the second cutting edge 13 is designated as the cutting surface 20. The cutting surface 20, in this case, does not have to come into full contact with a workpiece to be machined. In particular, the first cutting surface section 22 does not come into contact or only comes into contact partially with a workpiece to be machined. The first cutting edge 12 extends on the cutting surface 20 on one side of the cutting tooth 7 and is composed in the embodiment by two straight cutting edge sections. The first cutting edge 12 extends from the support surface 15 to the tooth tip 14 and, in the embodiment, advantageously only comes into contact with the workpiece to be machined over part of its length. During resharpening, the first cutting edge 12 is re-sharpened over its entire length.

The cutting surface sections 22 and 23 are each realized in a flat manner and meet one another at a cutting surface edge 24. The cutting surface edge 24 runs parallel to the support surface 15. In the embodiment, the cutting surface edge 24 is aligned parallel to the longitudinal center axes 18 of the bearing points 16 and 17 in the transverse direction of the saw chain 1. The roof section 11 has an underside 27 which faces the bearing point plane 19. The underside 27 is at a distance a to the support surface 15, measured perpendicularly to the running direction 21. The distance a, in this case, is the smallest distance between the underside 27 and the support surface 15 and is measured in the embodiment at the region of the roof section 11 located at the rear in the running direction 21. In the embodiment, the support surface 15 runs parallel to the bearing point plane 19. The cutting surface edge 24 is at a distance b from the support surface 15, which distance is measured perpendicularly to the running direction 21 and is smaller or slightly greater than the distance a. The distance b is advantageously greater than the distance a by less than 2 mm. In the non-sharpened state shown in FIGS. 1 and 2, the tooth tip 14 is at a distance c from the cutting surface edge 24, the distance c being measured perpendicularly to the running direction. In the embodiment, the distances b and c are approximately the same size in the non-sharpened state.

The support surface 15 is at a distance g from the bearing point plane 19. A connecting member 4 is arranged on the side of the drive links 2 remote from the cutting member 3. The connecting member 4 has a top side 38 which is located on the same side of the bearing point plane 19 as the cutting tooth 7. The top side 38 is at a distance f from the bearing point plane 19, the distance f being smaller than the distance g. As a result, the top side 38 of the connecting member 4, which is arranged next to the cutting member 3, is located lower than the support surface 15, that is, is offset in the direction toward the bearing point plane 15. The drive links 2 have a top side 39 which is at a distance o from the bearing point plane 19. In the embodiment, the distance o is also smaller than the distance g. In the embodiment, however, the distance o is slightly greater than the distance f. The distances f, g and o and the alignment of the support surface 15 are chosen such that even in the fully re-sharpened state, a file for resharpening the cutting tooth 7 does not come into contact with the top side 38 of the connecting member 4 or the top side 39 of the drive link 2 when the file is guided on the support surface 15.

As shown in FIG. 3, the connecting pin 5 projects through the cutting member 3, the connecting member 4 and the drive link 2 which is arranged centrally between the cutting member 3 and the connecting member 4. As is also shown in FIG. 3, in the sectional representation shown perpendicularly to the running direction 21, the contact surface 15 extends parallel to the bearing point plane 19. In the non-sharpened state, the support surface 15 is arranged on the flat basic body 26 of the cutting member 3 and does not extend into the cutting tooth 7 which is bent up out of the basic body. As is also shown in FIG. 3, the roof section 11 has a greatest thickness i. The thickness i is measured perpendicularly to the bearing point plane 19. The thickness of the roof section 11 decreases from the side section 10 in the direction toward the free end of the roof section 11. In the embodiment, the thickness i is constant in the longitudinal direction of the roof section 11, that is, in the running direction 21. However, it can also be provided that the thickness i decreases or increases in the running direction 21.

Figure 4:
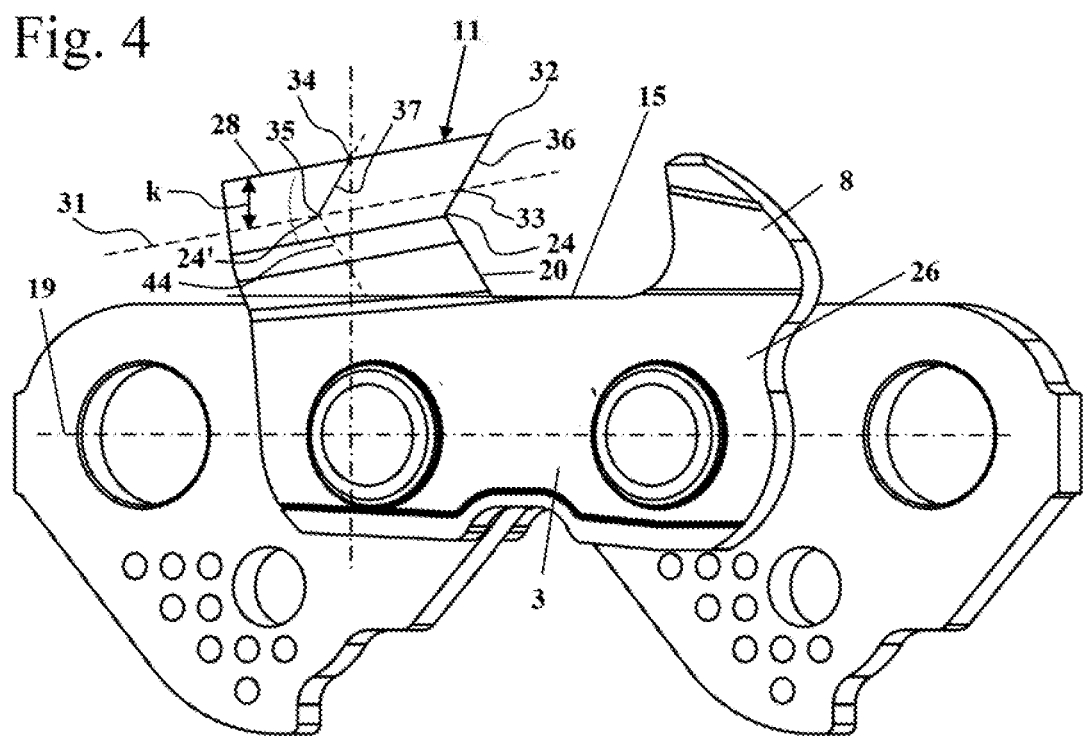
FIG. 4 and FIG. 5 show perspective representations of the detail of the saw chain in a viewing direction which corresponds to the sharpening direction.
Figure 7:
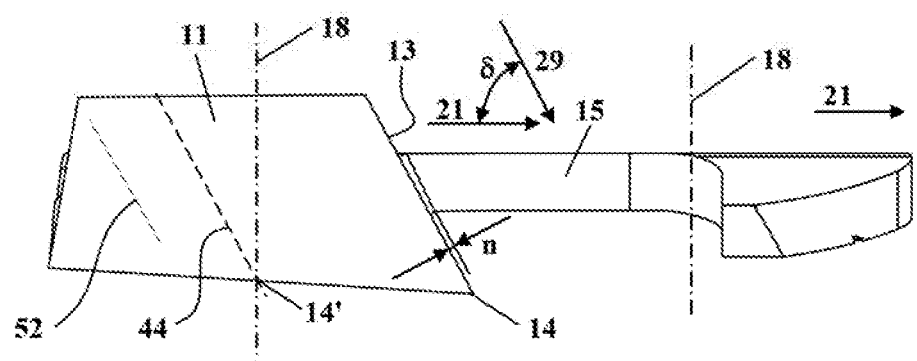
FIG. 7 shows a top view of the cutting member in the direction of the arrow VII in FIG. 6.

FIG. 4 shows a perspective representation of the section of the saw chain 1 shown in FIGS. 1 and 2 when looking in a sharpening direction 29 which is shown in FIG. 7. The sharpening direction 29 is the direction in which a file for resharpening the cutting tooth 7 is to be guided. The cutting surface 20 and the support surface 15 are aligned parallel to the sharpening direction 29 and appear as lines in the side view in the sharpening direction 29. In the embodiment, the sharpening direction 29 is inclined with respect to the running direction 21 at an angle δ which is less than 90°. The angle δ is shown in FIG. 7 and is advantageously between 20° and 80°, in particular between 40° and 70°.

As shown in FIG. 4, in the side view looking in the sharpening direction 29, the roof section 11 has an upper edge 28. The upper edge 28 is the section of the roof section 11 which is located away from the bearing point plane 19 and appears as a line in the side view. An imaginary line 31, which runs parallel to the upper edge 28, is marked in FIG. 4. The imaginary line 31 is at a distance k from the upper edge 28, the distance k being measured perpendicularly to the bearing point plane 19 and being at least as great as the greatest thickness i of the roof section 11 (FIG. 3). The imaginary line 31 therefore lies on the underside 27 or below the underside 27 of the roof section 11. The distance k is advantageously greater than the maximum thickness i by at least 0.8 mm.

A first point of intersection 32, which is the point of intersection between the upper edge 28 and the cutting surface 20, is marked in the side view shown in FIG. 4. A second point of intersection 33 is the point of intersection between the cutting surface 20 and the imaginary line 31. The two points of intersection 32 and 33 are connected in FIG. 4 by a first, imaginary connecting line 36. The first connecting line 36, in the embodiment, is located fully in the cutting surface 20. It can also be provided that the cutting surface 20 extends in a curved manner such that the first connecting line 36 is not located fully in the cutting surface 20. The first connecting line 36 specifies the inclination of the cutting tooth 7 in the region of the roof section 11 in a precise or approximate manner.

As a result of resharpening the cutting tooth 7, the cutting surface 20 is moved relative to the basic body 26 of the cutting member 3 parallel to the support surface 15 and along the extension of the support surface 15. The displaced cutting surface 20 is shown in FIG. 4 with a broken line as an imaginary displacement 44. The imaginary displacement 44 shown in FIG. 4 corresponds to a length of the cutting tooth 7 where the tooth tip 14' of the imaginary displacement 44 lies along the longitudinal center axis 18 of the rear bearing point 17 in a top view perpendicularly to the bearing point plane 19. On account of the perspective representation, the longitudinal center axis 18 does not lie perpendicularly to the sheet plane in FIG. 4. The actual arrangement can be seen in the top view in FIG. 7. In the side view shown, a third point of intersection 34 is the point of intersection between the displacement 44 and the upper edge 28 and a fourth point of intersection 35 is the point of intersection between the displacement 44 and the imaginary line 31. The points of intersection 34 and 35 are connected together by a second imaginary connecting line 37. As a result of both the second point of intersection 33 and the fourth point of intersection 35 being located on the same second cutting surface section 23 (FIG. 3) and the second cutting surface section 23 being realized in a flat manner, the connecting lines 36 and 37 extend parallel to one another. In the embodiment, the distance k is chosen such that the fourth point of intersection 35 lies on the displaced cutting surface edge 24'. The cutting surface edge 24 is moved parallel to the contact surface 15 during resharpening. If the distance k is chosen to be greater, the connecting lines 36 and 37 are no longer parallel to one another as the second point of intersection 33 lies in the second cutting surface section 23 and the fourth point of intersection 35 creeps into the first cutting surface section 22 during resharpening and, as a result, the second connecting line 37 has a steeper progression than the first connecting line 36.

Figure 5:
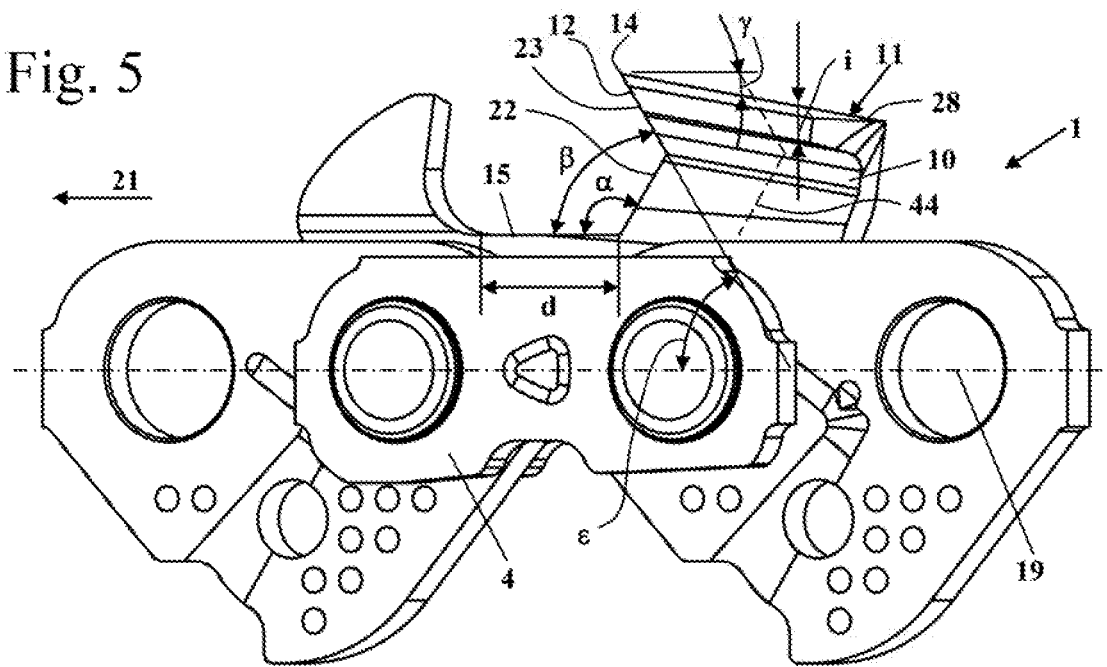

FIG. 5 shows a perspective representation of the section of the saw chain 1 in the sharpening direction 29 from the oppositely situated side of the saw chain 1. In the view, the connecting member 4 lies in front of the cutting member 3 in the viewing direction. As shown in FIG. 5, the first cutting surface section 22, which is realized fully on the side section 10 of the cutting tooth 7, encloses an angle α with the support surface 15. The angle α is greater than 90°. An angle α between 100° and 160°, in particular between 110° and 140°, preferably of approximately 120°, is provided in the embodiment. The support surface 15 encloses with the second cutting surface section 23, on which the tooth tip 14 is arranged, an angle β which is smaller than 90°. The angle β is advantageously between 20° and 80°, in particular between 40° and 70°, in a preferred manner is approximately 60°. An undercut is formed on the cutting tooth 7 by the angles α and β. The region of the cutting surface 20 which is located the furthest back in the running direction 21 lies between the second cutting edge 13 and the support surface 15. As a result, it is possible to achieve both a sufficiently wide connection between the cutting tooth 7 and the tooth root 25 (FIG. 1) and a favorable cutting angle ε. In the embodiment, the support surface 15 is aligned parallel to the bearing point plane 19. The second cutting surface section 23 encloses with the bearing point plane 19 the cutting angle ε which corresponds to the angle β. The cutting angle ε is advantageously configured for good metal cutting and chip removal. The cutting angle ε corresponds to the angle which the connecting lines 36 or 37 enclose with the bearing point plane 19 as, in the embodiment, the connecting lines 36 and 37 lie fully in the second cutting surface section 23. In the first cutting surface section 22, the cutting surface 20 has a normal which, with the support surface 15 and the bearing point plane 19, encloses an angle which differs from 0° and from 90°. Correspondingly, the second cutting surface section 23 has a normal which, with the support surface 15 and the bearing point plane 19, encloses an angle which differs from 0° and from 90°.

As shown in FIG. 5, the upper edge 28 is also inclined with respect to the running direction 21. The upper edge 28 encloses with the running direction 21 a free angle γ which is marked in FIG. 5 with a parallel line with respect to the running direction 21. The free angle γ is advantageously at least 3°, in particular at least 5°. As FIG. 5 also shows, the support surface 15 in the embodiment has a length d measured in the running direction 21.

Figure 6:
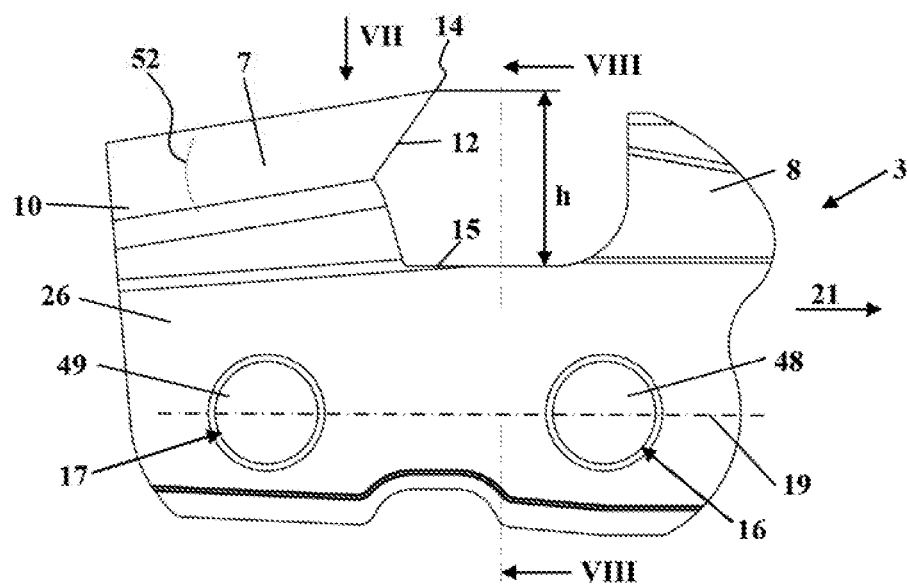
FIG. 6 shows a side view of the cutting member of the saw chain.

FIG. 6 shows a side view of the cutting member 3. As shown in FIG. 6, the basic body 26 of the cutting member 3 has a front bearing point 48 and a rear bearing point 49, which are realized in the embodiment as openings for the connecting pins 5. However, another connection between the cutting member 3 and adjacent the leading and trailing drive links 2 and connecting members 4 can also be advantageous.

As FIG. 6 also shows, the cutting tooth 7 has a height h which is measured from the tooth tip 14 to the support surface 15 and perpendicularly to the bearing point plane 19. A marking 52, which shows the position of the cutting surface 20 in the maximum re-sharpened state of the cutting member 3, can be seen on the side section 10 and on the roof section 11 in FIGS. 6 and 7.

Figure 11:
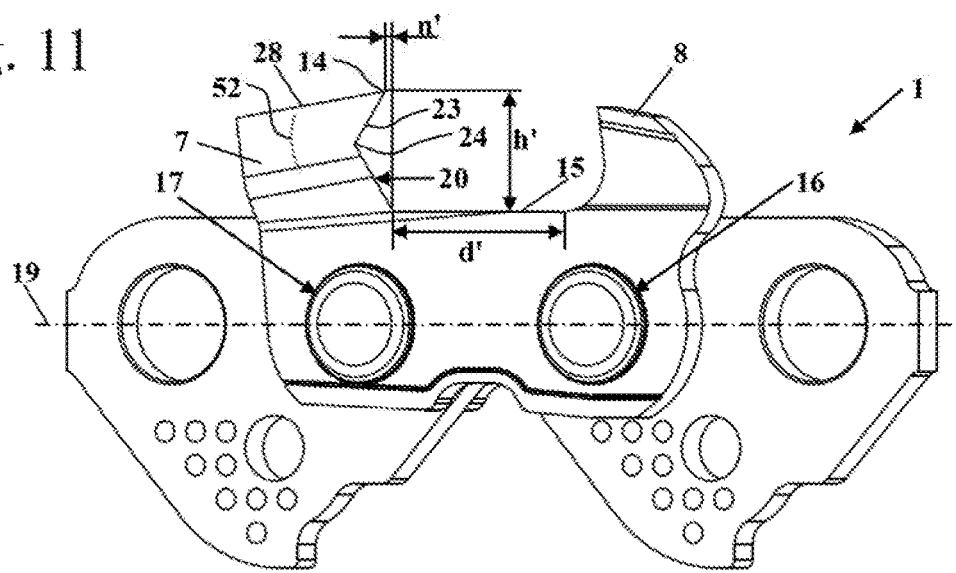
FIG. 11 and FIG. 12 show perspective representations when looking in the sharpening direction in a first resharpening state of the section of the saw chain.

As shown in FIG. 7, the cutting edge 13 in the non-re-sharpened state lies behind the support surface 15 in the running direction 21. The cutting edge 13, in this case, lies in a top view perpendicularly to the bearing point plane 19, as shown in FIG. 7, in each region behind the section of the support surface 15 leading in each case in the running direction. In the side view shown in FIG. 6, the tooth tip 14 lies above the support surface 15, however, as shown in FIG. 7, offset laterally thereto. The second cutting edge 13 is at a distance n to the support surface 15, measured in the viewing direction perpendicularly to the bearing point plane 19 and perpendicularly to the cutting edge 13. The distance n is produced in a side view in the sharpening direction 29 as a distance, measured parallel to the bearing point plane 19, between the tooth tip 14 and the support surface 15. The distance n is comparatively small and at each point of the cutting edge 13 is advantageously no more than a third, in particular no more than a quarter of the height h of the cutting tooth 7. In the resharpening state, the distance n is advantageously no more than a third, in particular no more than a quarter of the current height h of the cutting tooth 7. The height h of the cutting tooth 7 is reduced by the free angle γ (FIG. 5) as the degree of resharpening increases, and the distance n is increased. The height h' and the distance n' for the resharpening state shown in FIG. 11 is marked in FIG. 11. In the non-re-sharpened initial state, the distance n is advantageously less than 10% of the tooth height h. In the fully resharpened state, the distance n is advantageously between 15% and 30%, in particular between 20% and 25% of the tooth height h.

FIG. 7 shows the position of the tooth tip 14' in the imaginary displacement 44 of the cutting surface 20. As shown in FIG. 7, the tooth tip 14' of the imaginary displacement 44 lies on the longitudinal center axis 18 of the rear bearing point 17 in the top view perpendicularly to the bearing point plane 19.

FIG. 8 shows the alignment of the cutting surface edge 24 and of the support surface 15 parallel to the bearing point plane 19 looking in the running direction 21. As is also shown in FIG. 8, the cutting edge 13 extends at an angle φ to the bearing point plane 19 looking in the running direction 21. The angle φ is advantageously greater than 2°, in particular greater than 5°. The angle φ is advantageously less than 20°. The distance between the cutting edge 13 and the bearing point plane 19, in this case, reduces as the distance from the tooth tip 14 increases.

FIGS. 9 and 10 show a schematic representation of a file 40 for resharpening the cutting member 3 on the chain saw 1. The file 40 has a cross section in the form of a regular hexagon. In the side views shown, the sharpening direction 29 runs parallel to the bearing point plane 19. However, the sharpening direction 29 is at an angle in relation to the sheet plane (see FIG. 7). As shown in FIG. 9, the file 40 has a longitudinal center axis 51 which is aligned in the sharpening direction 29. The file 40 has two unhewn guide surfaces 41 which are located opposite one another, two first file surfaces 42 which adjoin a guide surface 41 in each case in the circumferential direction and are located opposite one another and two second file surfaces 43 which adjoin the first file surfaces in the circumferential direction. A guide surface 41 adjoins each of the second file surfaces 43 on the side located away from the first file surface 42. The guide surfaces 41 are provided for support on the support surface 15. The first file surfaces 42 are provided for filing the first cutting surface section 22 and the second file surfaces 43 are provided for filing the second cutting surface section 23. The file 40 can be placed on the support surface 15 in two positions, which are rotated about the longitudinal center axis 51 relative to one another by 180° and are used for filing.

As shown in FIG. 9, in the non-re-sharpened state of the cutting tooth 7, the file 40 extends in the direction perpendicularly to the support surface 15 at least to the tooth tip 14. The file 40 extends in the height direction from the support surface 15 at least to the tooth tip 14. The file 40 extends over the entire height h (FIG. 6) of the cutting tooth 7. In the embodiment, the support surface 15 is aligned parallel to the bearing point plane 19. During resharpening the file 40 is consequently guided in the opposite direction to the running direction 21 and parallel to the bearing point plane 19. The file 40 is guided on the support surface 15 in an opposite direction to the running direction 21. The file 40 is moved back and forth along its longitudinal center axis 51 on the support surface 15 and at the same time is pressed and guided against the cutting surface 20 (FIG. 8) in the opposite direction to the running direction 21. As a result of the file surface 42 directly adjoining the unhewn guide surface 41, the cutting surface section 22 is re-sharpened up to the support surface 15 and the file 40 can be guided along the support surface 15. As a result of the file 40 being guided along the support surface 15, the support surface 15 is extended during resharpening of the cutting surface 20 (FIG. 8). As a result of the guide surface 41 not being smooth, the support surface 15 is not re-sharpened such that the length and alignment of the support surface 15 is maintained. This makes simple resharpening itself possible for an inexperienced user. The user has simply to ensure the file 40 bears against the support surface 15 and the cutting face 20. The user places the file 40 onto the support surface 15 and moves the file 40 in the sharpening direction 29 on the support surface 15. Lifting the file 40 from the support surface 15 or the file 40 tilting in relation to the support surface 15 is not provided during resharpening.

Figure 12:
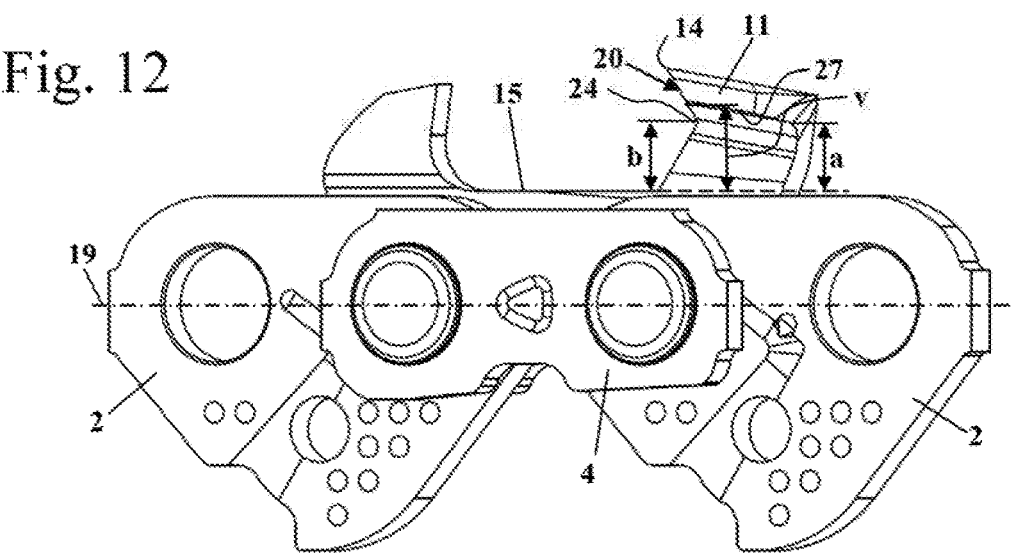
Figure 13:
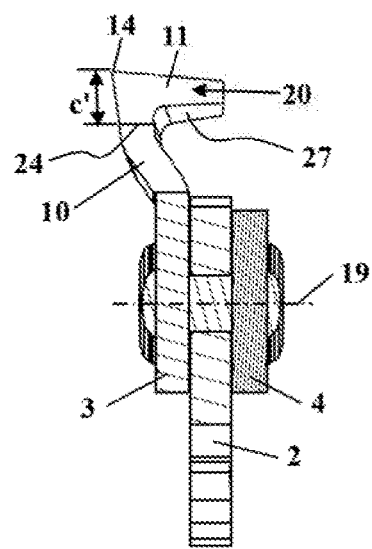
FIG. 13 shows a sectional representation of the saw chain in the resharpening state shown in FIG. 11 and FIG. 12 along the line III-III in FIG. 1.

FIGS. 11 to 13 show the saw chain 1 in a first resharpening state in which the support surface has a length d' which is greater than the length d. On account of the inclination of the upper edge 28 of the roof section 11, the distance between the tooth tip 14 and the bearing point plane 19 has reduced as a result of the resharpening. The distance between the cutting surface edge 24 and the bearing point plane 19 is unchanged such that the height of the second cutting surface section 23 has decreased during resharpening. The first cutting surface section 22 is unchanged in length and alignment. Simply the position with reference to the bearing points 16 and 17 has changed.

As shown in FIG. 12, the underside 27 of the roof section 11 is at a smallest angle a, measured perpendicularly to the bearing point plane 19, with respect to the support surface 15. In the resharpening state shown, the underside 27 on the cutting surface 20 is at a distance v from the support surface which is greater than the distance b.

As shown in FIG. 13, the cutting surface edge 24 in the resharpening state shown lies below the underside 27 of the roof section 11, that is, at a smaller distance from the bearing point plane 19 than the underside 27. The cutting surface edge 24 and the underside 27, in this case, are arranged laterally offset to one another. In the resharpening state shown, the cutting surface edge 24 is situated fully in the side section 10 of the cutting member 3. The distance between the tooth tip 14 and the cutting surface edge 24 has reduced to the distance c' which is smaller than the distance c in the non-re-sharpened state (FIG. 2).

Figure 14:
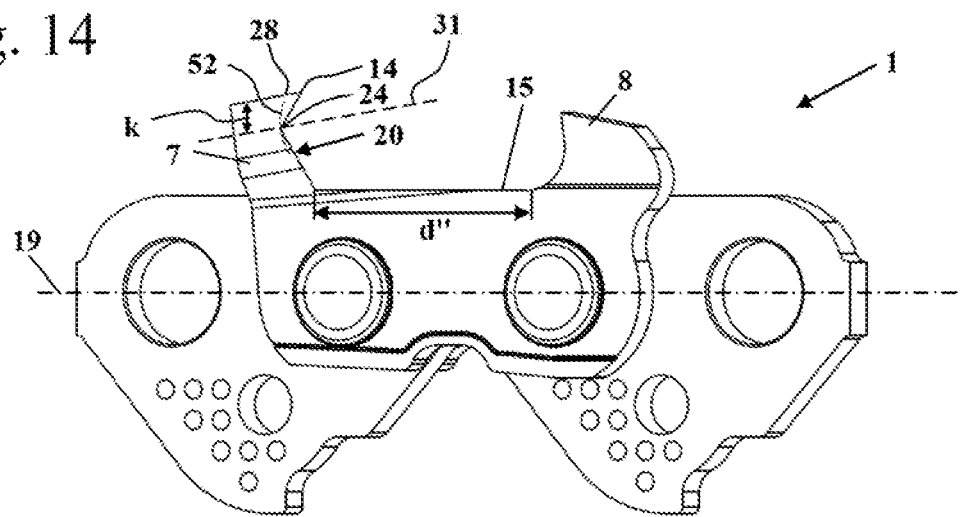
FIG. 14 and FIG. 15 show perspective representations of the section of the saw chain when looking in the sharpening direction in a second resharpening state.
Figure 15:
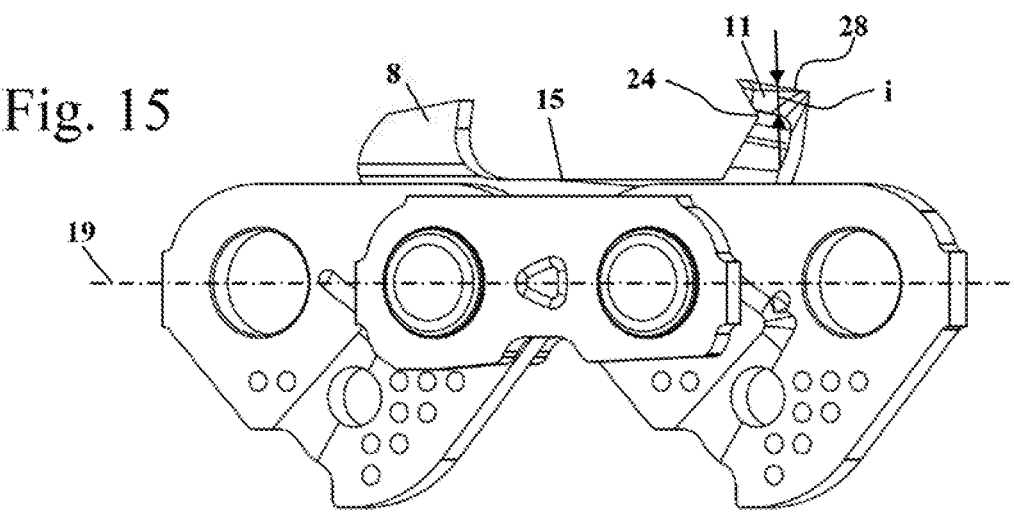
Figure 16:
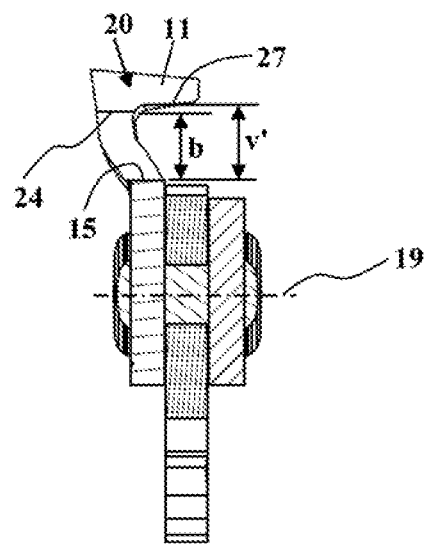
FIG. 16 shows a section through the saw chain in the resharpening state from FIG. 14 and FIG. 15 in a section along the line III-III in FIG. 1.

FIGS. 14 to 16 show the saw chain 1 in the fully re-sharpened state of the cutting tooth 7. The fully re-sharpened state, in this case, is advantageously the state in which the remainder of the cutting tooth 7 is dimensioned in a barely sufficient manner to absorb the cutting forces occurring. The cutting surface 20 projects up to the marking 52. The imaginary line 31 and the distance k are also marked in FIG. 14. As FIGS. 14 and 15 show, the distance k is chosen such that the distance k is greater than the thickness i of the roof section 11 even in the fully re-sharpened state. The amount of the distance k corresponds to the distance, measured perpendicularly to the bearing plane 19, between the cutting surface edge 24 and the upper edge 28 of the roof section 11 in the fully re-sharpened state. The support surface 15 has a length d" which is greater than the length d' and the length d. As shown in FIG. 16, the distance b between the cutting surface edge 24 and the support surface 15 is also smaller in the resharpening state than the distance v' between the underside 27 of the roof section 11 on the cutting surface 20 and the support surface 15. The cutting surface edge 24 therefore lies below the roof section 11. The distance has reduced relative to the resharpening state from FIGS. 11 to 13 from the distance v to the distance v'. In the fully re-sharpened state, it can be expedient for the distance v' to correspond to the distance b such that the cutting surface edge 24 lies at the height of the underside 27 of the roof section 11. The cutting surface edge 24, in a preferred realization, lies at a distance from the roof section 11 in all admissible resharpening states.

Figure 17:
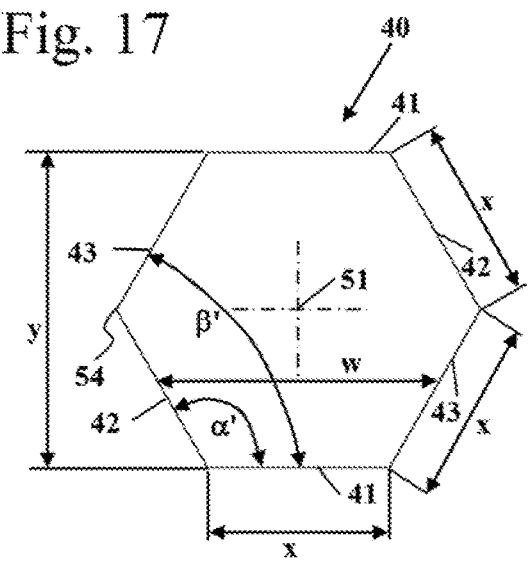
FIG. 17 shows a schematic cross section of a file for resharpening the cutting member shown in FIGS. 1 to 16.

FIGS. 17 to 20 show embodiments of a file 40 for filing the cutting tooth 7 shown in FIGS. 1 to 16. FIG. 17 shows a file 40, the cross section of which is realized as a regular hexagon. The guide surface 41 has an edge dimension x. In the embodiment, the edge dimension x is the length of the guide surface 41 in a cross section perpendicular to the longitudinal center axis 51. The length of the guide surface 41 can differ from the length of the support surface 15. In an advantageous manner, in the initial state the support surface 15 comprises a length of at least one third of the length of the guide surface 41. The file surfaces 42 and 43 have the same edge dimension x. The guide surface 41 encloses with the file surface 42, which adjoins in the circumferential direction, an angle α' which is 60° in the embodiment. The angle α' is matched to the angle α of the cutting member 3 and is the same size as the angle. The guide surface 41 encloses with the second file surface 43 connecting to the file surface 42 in the circumferential direction a circumferential angle β' which is 60° in the embodiment. The angle β' is matched to the angle β of the cutting member 3 and is the same size as the angle. The distance y between the oppositely situated guide surfaces 41 is double the size of the distance b between the cutting surface edge 24 of the cutting member 3 and the support 15. The longitudinal edge 54 between the file surfaces 42 and 43 lies in the cutting surface edge 24 when the file 40 is utilized for resharpening the cutting surface 20.

In the case of the embodiment shown in FIG. 17, two guide surfaces 41 in each case and two file surfaces 42 or 43 in each case are provided such that the file 40 can be used to file the cutting tooth 7 in two positions rotated by 180° about the longitudinal center axis 51. The file 40 has a width w which is measured parallel to the guide surface 41. In a first region, which is connected to the guide surface 41 and extends up to the height of the longitudinal edge 54 and of the longitudinal center axis 51, the width w increases as the distance from the guide surface 41 increases. In a second region which extends from the plane defined by the longitudinal center axis 51 and the longitudinal edges 54 to the side remote from the lower guide surface 41, the width w decreases as the distance from the lower guide surface 41 increases. The longitudinal edge 54 is the region with the greatest width w.

Figure 18:
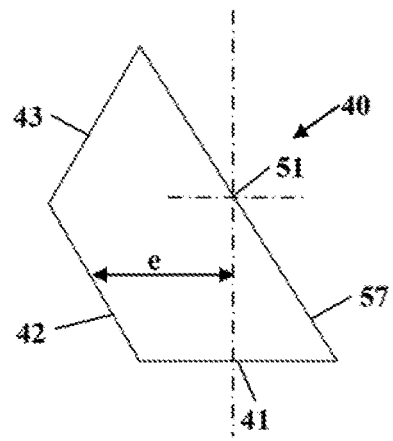
FIG. 18 to FIG. 20 show schematic cross sectional representations of embodiments of files for resharpening a cutting member.

FIG. 18 shows an embodiment of a file 40 which only has one guide surface 41, one first file surface 42 and one second file surface 43 which are arranged adjoining one another in the circumferential direction. The dimensions and alignments of the guide surface 41 and of the two file surfaces 42 and 43 correspond in an advantageous manner to those of the embodiment according to FIG. 17. The cross section of the file 40 from FIG. 18 is in the form of half a hexagon. The longitudinal side 57 oppositely situated to the file surface 42 is realized in a planar manner in the embodiment. The longitudinal side 57 is without function and can consequently assume any arbitrary form. The file 40 has a center plane 30 which includes the longitudinal center axis 51 and is aligned perpendicular to the guide surface 41. The distance, measured parallel to the guide surface 41, between the file surface 42 and the center plane increases in the region of the first file surface 42. The distance e between the file surface 43 and the center plane 30 decreases in the region of the second file surface 43 as the distance to the guide surface 41 increases. A geometry of the cutting surface 20 with an undercut is achieved as a result.

Figure 19:
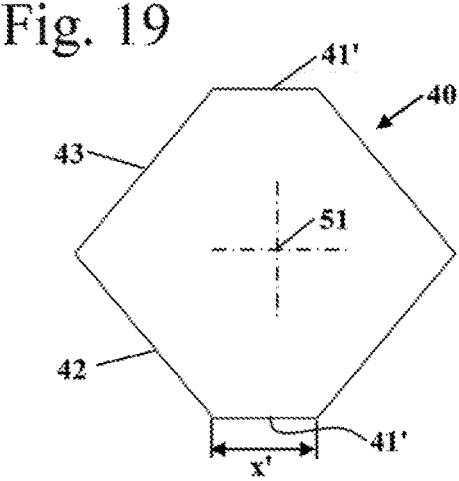
Figure 20:
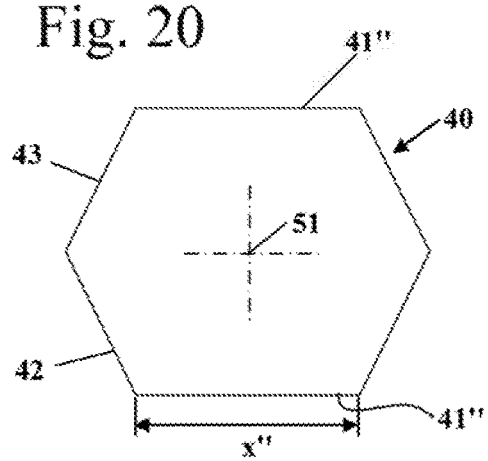

FIG. 19 shows an embodiment of a file 40 where guide surfaces 41 are provided which have a reduced edge dimension x'. The edge dimension x' is advantageously at least 3 mm. The edge dimension x and the edge dimension x' for the embodiment from FIG. 20 are also advantageously at least 3 mm in order to achieve sufficient support of the file 40 on the support surface 15. In the case of the embodiment according to FIG. 20, guide surfaces 41" are provided which have an enlarged edge dimension x" compared to the guide surfaces 41 from FIG. 17. Apart from the edge dimension x' or x", the files 40 from FIGS. 19 and 20 correspond to the embodiment according to FIG. 17. In particular, the length of the second file surface 42 and the alignment of the second file surface 42 compared to the guide surface 41' are functionally relevant. The form, length and alignment of the first file surface 42 in relation to the guide surface 41' can also be chosen to be different to what is shown. The file 40 can, in particular, also be configured in a symmetrical manner. The ratio of the sum of the lengths of the unhewn guide surfaces 41 to the sum of the lengths of the file surfaces 42, 43 is advantageously greater than a quarter, in particular greater than a third, preferably greater than half.

Figure 21:
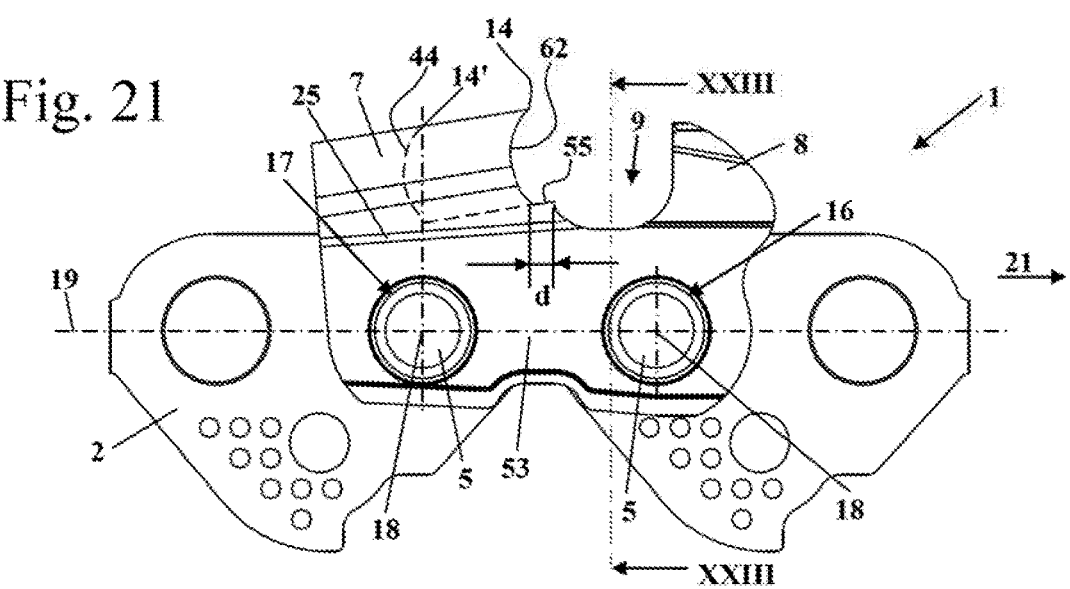
FIG. 21 and FIG. 22 show side views of a section of a further embodiment of a saw chain.

FIGS. 21 to 31 show an embodiment of a saw chain 1 with a cutting member 53. Elements which correspond to one another are designated in all the figures by identical reference signs. The saw chain 1 from FIG. 21 is constructed corresponding to the saw chain 1 from the preceding figures. The saw chain 1 differs from the preceding embodiment in the configuration of the cutting tooth 7 of the cutting member 53. The cutting tooth 7 has a first cutting edge 62 which, as shown in FIG. 21, extends in a curved manner in contrast to the first cutting edge 12. The first cutting edge 62 is arranged laterally. A support surface 55 is realized in front of the first cutting edge 62. The support surface 55 in the embodiment forms a part of the bottom of the cutout 9. However, the support surface 55 only extends over a section of the bottom of the cutout 9. The length d of the support surface 55, measured in the running direction 21, is at least 3 mm. During the resharpening operation, the first cutting edge 62 is displaced together with the cutting surface 20 shown in FIG. 22 in the opposite direction to the running direction 21 and parallel to the support surface 55. FIG. 21 shows an imaginary displacement 44 of the cutting surface 20 where the tooth tip 14' of the imaginary displacement 44 lies perpendicularly to the bearing point plane 19 above the longitudinal center axis 18 of the rear bearing point 17. The displacement is effected, in this case, in extension of the support surface 55, that is, along a plane in which the support surface 55 lies.

Figure 22:
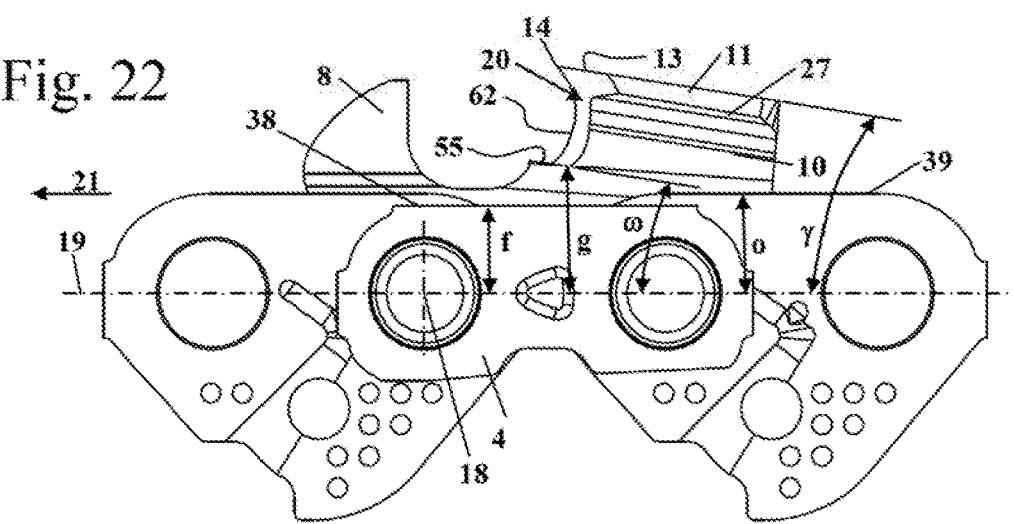

As shown in FIG. 22, the support surface 55 is inclined by an angle ω with respect to the bearing point plane 19 looking in the direction of the longitudinal center axes 18 of the bearing points 16 and 17. In the embodiment, the angle ω corresponds to the angle γ by which the upper edge 28 is inclined in relation to the bearing point plane 19. The support surface 55 extends, therefore, parallel to the upper edge 28 of the roof section 11 of the cutting member 53. The angle ω, by which the support surface 55 is inclined in relation to the bearing point plane 19, is advantageously between 2° and 20°, in particular between 5° and 15°. As is also shown in FIG. 22, the support surface 55 is at a distance g, measured perpendicularly to the bearing point plane 19, from the bearing point plane 19. The distance g, in this case, is the smallest distance between the support surface 55 and the bearing point plane 19 and in the embodiment is measured directly adjacent the cutting surface 20 on account of the inclination of the support surface 55. The distance g is clearly greater than the distance f between the upper side 28 of the adjacent connecting member 4 and the bearing point plane 19. The difference between the distances g and f is advantageously chosen such that the distance g is still greater than the distance f even in the maximum re-sharpened state of the cutting surface 20. The distance g is advantageously also greater than the distance o between the upper side 39 of the drive link 2 and the bearing point plane 19 in the fully re-sharpened state.

Figure 23:
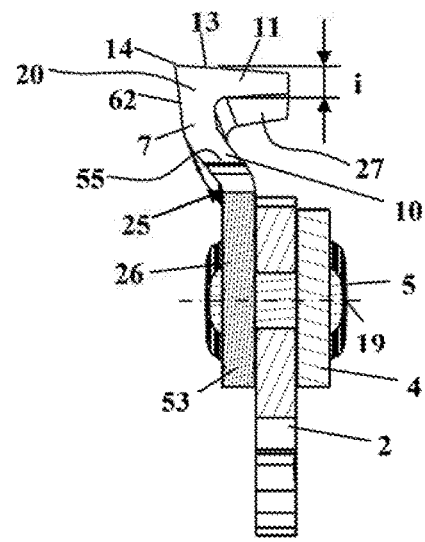
FIG. 23 shows a section along the line XXIII-XXIII in FIG. 21.

As also shown in FIG. 22, the cutting surface 20 extends in a curved manner, whilst the support surface 55 is realized in a planar manner. The cutting surface 20 is realized as a continuous, curved surface on which both the first cutting edge 62 and the second cutting edge 13 are realized. The cutting surface 20 also extends into the roof section 11. As shown in FIG. 23, the roof section 11 has a maximum thickness i and an underside 27. The cutting tooth 7 is connected to the planar basic body 26 of the cutting member 53 at the tooth root 25, in particular is integrally formed thereon.

Figure 24:
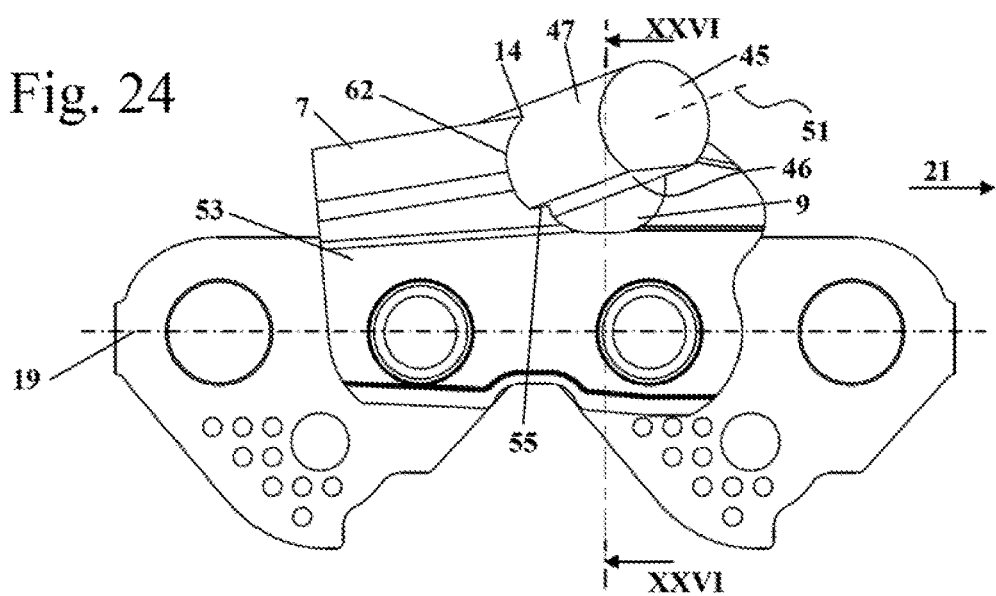
FIG. 24 and FIG. 25 show side views of the section of the further embodiment of a saw chain with a schematically shown file arranged thereon.
Figure 25:
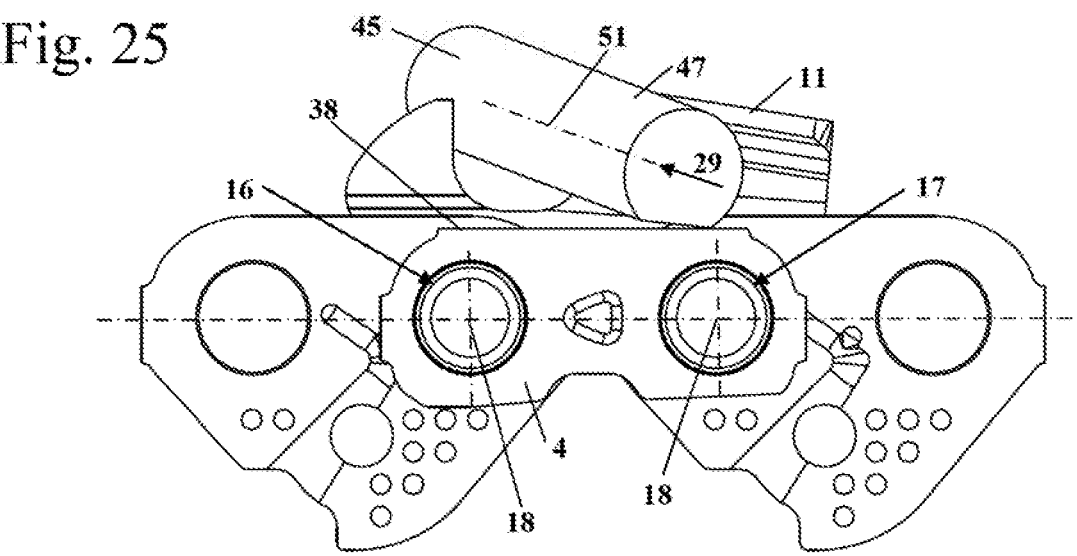
Figure 26:
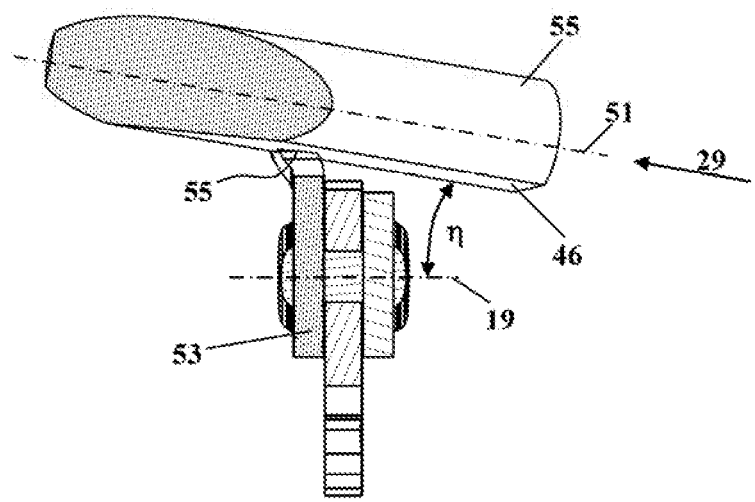
FIG. 26 shows a section along the line XXVI-XXVI in FIG. 24.

FIGS. 24 to 26 show a file 45 for resharpening the cutting member 53 on the cutting member 53. During resharpening, the file 45 is aligned in a resharpening direction 29 with its longitudinal center axis 51. As shown in FIGS. 24 to 26, the resharpening direction 29 is inclined with respect to the bearing point plane 19 and to the running direction 21.

The file 45 is realized as a round file with a flattened side. A guide surface 46, on which the file 45 is not smooth, is realized on the flattening. A curved file surface 47, which has an arcuate cross section in the embodiment and connects the two longitudinal sides of the guide surface 46 to one another, connects to the planar guide surface 46. On the file surface 47, the file 45 has teeth for machining which engage the cutting surface 20. The file 45 rests on the support surface 55 with the guide surface 46. As shown in FIG. 26, when looking in opposite direction to the running direction 21, the guide surface 46 encloses an angle η with the bearing point plane 19 which is advantageously between 2° and 10°, in particular between 3° and 8°. The angle η is approximately 5° in the embodiment. The inclination of the guide surface 46 corresponds to the inclination of the support surface 55 in the transverse direction of the cutting member 53 shown in FIG. 26. The support surface 55 extends, therefore, neither looking in the running direction 21 nor looking in the direction of the longitudinal center axis 18 of the bearing points 16 and 17, parallel to the bearing point plane 19. As a result of the specified spatial orientation of the support surface 55, correct alignment of the file 45 with respect to the cutting tooth 7 in at least one direction in space is made possible for the user. Furthermore, the distance at which the file is to be moved above the bearing point plane 19 is specified for the user so that a constant cutting angle is ensured and weakening of the basic body 26 of the cutting member 53 is avoided.

Figure 27:
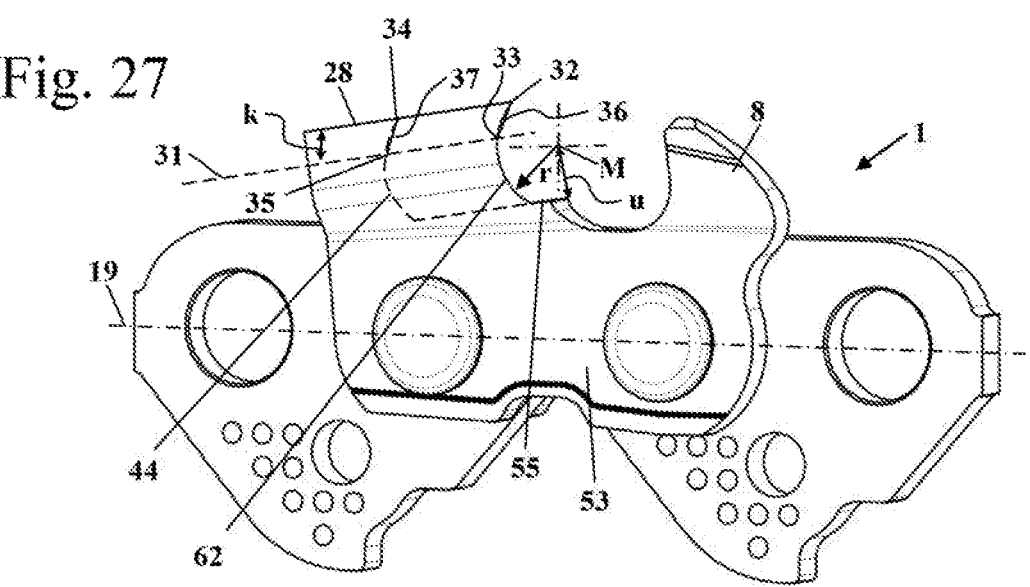
FIG. 27 shows a perspective representation of the section of the saw chain from FIGS. 21 to 23 when looking in the sharpening direction.

FIG. 27 shows a perspective representation of the saw chain 1 looking in the resharpening direction 29. In the viewing direction, the cutting edge 62 coincides with the cutting surface 20. FIG. 27 also marks the imaginary displacement 44 of the cutting surface 20 or of the cutting edge 62. In the viewing direction, the cutting edge 62 extends as a circular arc about a center point M at a radius r. The support surface 55 is at a distance u, measured perpendicularly to the support surface 55, from the center point M. The distance u is advantageously smaller than the radius r. The support surface 55, in this case, is arranged closer to the bearing point plane 19 than the center point M. The cutting edge 62 has a first point of intersection 32 which is the point of intersection between the cutting edge 62 and the upper edge 28 of the roof section 11. A second point of intersection 33 is the point of intersection between an imaginary line 31 and the cutting edge 62. The imaginary line 31 is at a distance k from the upper edge 28 which is greater than the maximum thickness i of the roof section 11. The points of intersection 32 and 33 are connected by an imaginary connecting line 36. Correspondingly, a third point of intersection 34 on the imaginary displacement 44 is the point of intersection between the imaginary displacement 44 and the upper edge 28 and a fourth point of intersection 35 is the point of intersection between the imaginary displacement 44 and the imaginary line 31. The third point of intersection 34 and the fourth point of intersection 35 are connected to a connecting line 37. The connecting lines 36 and 37 extend parallel to one another. The parallelity of the connecting lines 36 and 37 is produced as a result of the support surface 55 extending parallel to the upper edge 28. The region between the points of intersection 32 and 33 is filed by the same circumferential section of the file 45 as the region between the points of intersection 34 and 35 in the corresponding resharpening state. As a result, the connecting lines 36 and 37 achieve the same inclination. In the region between the points of intersection 32 and 33, the cutting surface 20 has normals which enclose angles, which differ from 0° and 90°, with the support surface 55 and the bearing point plane 19. In the region of the cutting surface 20 which is closer to the bearing point plane 19 than the center point M, the cutting surface 20 has further normals which enclose angles, which differ from 0° and 90°, with the support surface 55 and the bearing point plane 19. A normal on the cutting surface 20 which extends parallel to the bearing point plane 19 is given between the two regions.

Figure 28:
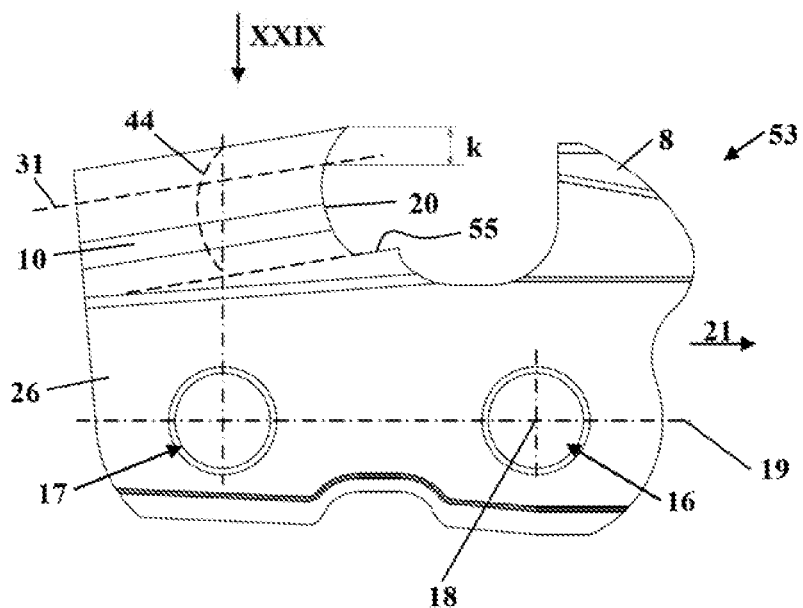
FIG. 28 shows a side view of the cutting member of the saw chain from FIGS. 21 to 27.

FIG. 28 shows a side view of the cutting member 53 looking in the direction of the longitudinal center axes 18 of the bearing points 16 and 17. In the case of a saw chain 1, the chain links of which are connected via connecting pins 5, the longitudinal center axis 18 is the longitudinal center axis of the connecting pins 5.

Figure 29:
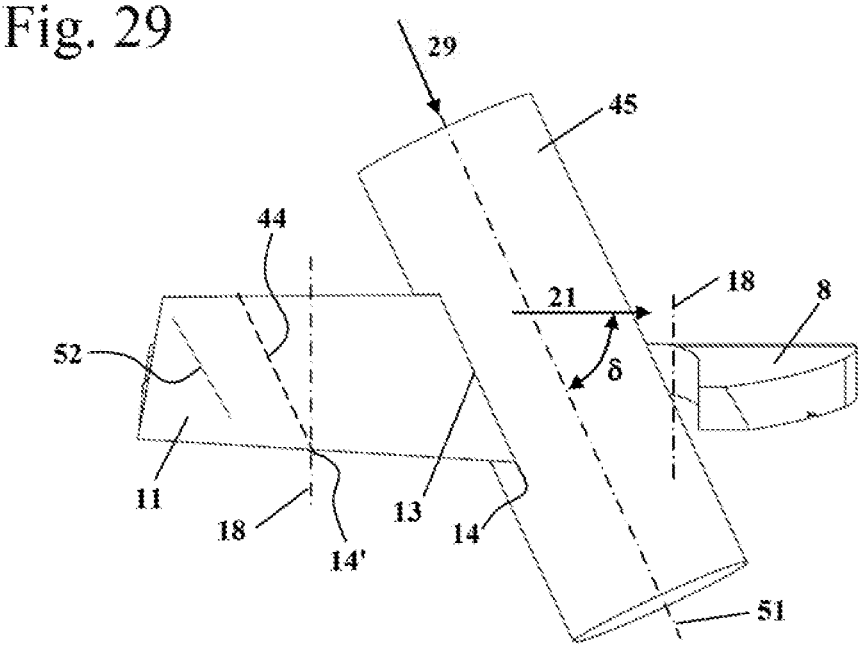
FIG. 29 shows a top view of the cutting member from FIG. 28 in the direction of the arrow XXIX in FIG. 28 with a schematically shown file for resharpening.

FIG. 29 shows the alignment of the sharpening direction 29. The sharpening direction 29 encloses an angle δ with the running direction 21. FIG. 29 also shows the arrangement of the imaginary displacement 44 where the tooth tip 14' of the imaginary displacement 44 is arranged perpendicularly to the bearing point plane 19 above the longitudinal center axis 18 of the rear bearing point 17. As FIG. 29 also shows, the marking 52 is at a distance from the imaginary displacement 44. The cutting tooth 7 is therefore able to be re-sharpened still further when the cutting surface 20 is situated on the imaginary displacement 44.

Figure 30:
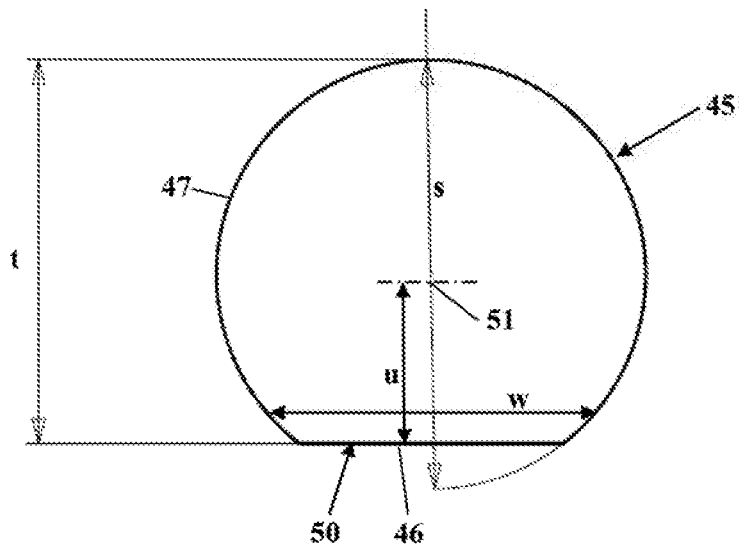
FIG. 30 shows a schematic cross sectional representation of an embodiment of a file for resharpening the cutting member.

FIG. 30 shows a schematic cross section of the file 45. On the file surface 47, the file 45 has a diameter s which corresponds to double the radius r of the cutting edge 62 (FIG. 27). The file 45 has a flattening 50 on which the guide surface 46, which is not smooth, is realized. On the flattening 50, the file 45 has a reduced height t which is smaller than the diameter s. The distance between the longitudinal center axis 51 and the flattening 50 corresponds to the distance u between the support surface 55 and the center point M which is also marked schematically in FIG. 30. The center point M corresponds to the center point of the circle on which the file surface 47 lies. The guide surface 46 extends advantageously over at least one sixth of the circumference of the file 45. The file 45 has a width w which is measured parallel to the guide surface 46 and which increases as the distance from the guide surface 46 increases. As a result, an undercut is generated on the cutting surface 20. The file surface 47 extends in the embodiment over a circumferential angle of more than 270° about the center point M and connects directly to both longitudinal sides of the guide surface 46. In an expedient manner, a file 45 can also be formed only by a segment of the file 45 shown in FIG. 30 such that the arcuate file surface 47 does not merge directly into the planar guide surface 46 at least on one longitudinal side.

Figure 31:
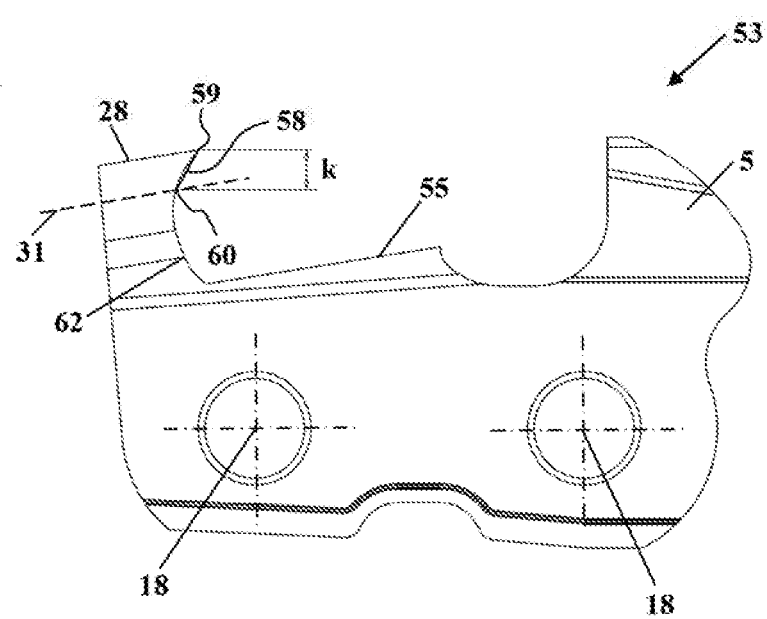
FIG. 31 shows a side view of the cutting member from FIG. 28 in the fully re-sharpened state.

FIG. 31 shows the cutting member 53 in the fully re-sharpened state. A connecting line 58, which is shown schematically in FIG. 31 and connects a fifth point of intersection 59 of the cutting edge 62 with the upper edge 28 of the roof section 11 to a sixth point of intersection of the cutting edge 62 with the imaginary line 31, lies parallel to the connecting lines 36 and 37 (FIG. 27) even in the fully re-sharpened state. The connecting line 58, in this case, is actually to be shown looking in the sharpening direction 29 and is only shown schematically in FIG. 31.

In an alternative realization, the support surface 15, 55 can be formed by only part of the bottom which delimits the cutout 9. In a further alternative configuration, the support surface 15 can be inclined by an angle η (FIG. 26) with respect to the bearing point plane 19 when looking in the running direction 21. Further advantageous embodiments are produced by arbitrary combinations of individual features of the above-described embodiments.

FIGS. 32A to 41B show further embodiments of files for filing a cutting tooth 7. Identical reference signs in this case designate the same elements as in the previous figures.

FIGS. 32A and 32B illustrate a file 40 which has an unhewn guide surface 41, a first file surface 42 for filing the first cutting surface section 22, and a second file surface 43 for filing the second cutting surface section 23. The file 40 has further file surfaces 42 and 43 located opposite the file surfaces 42 and 43. The first file surfaces 42 are in this case arranged on both sides of the guide surface 41 and adjoin the latter. The second file surfaces 43 are extended on the side remote from the guide surface 41 and butt against one another at a longitudinal edge 66. Compared to a symmetrical, hexagonal configuration of the cross section of the file 40, which is indicated by a dashed line 65 in FIG. 32B, the file 40 has, on the side 64 located opposite the guide surface 41, an additional continuous elevation 67, which has a triangular cross section. This results in an irregular pentagonal cross section of the file 40. In the embodiment, the elevation 67 extends along the entire length l of the first file surface 42. The length l of the first file surface 42 corresponds in this case to the length of the longitudinal section which is intended to come into contact with the first cutting surface section 22 (FIG. 2) during filing.

The elevation 67 forms a visual and haptic indication, which indicates to the user the rotational position of the file 40 about its longitudinal center axis 51. The elevation 67 at the same time has the effect that the file 40 can be placed on a support surface 15 only with the guide surface 41. Stable placement with the elevation 67 on the support surface 15 is not possible geometrically. As a result, the cross section of the file 40 clearly defines an orientation of the file 40 during filing. Since in each case two first file surfaces 42 and two second file surfaces 43 are provided, the file 40 can be moved in the same sharpening direction 29 in order to file right-hand cutting teeth 7 and left-hand cutting teeth 7. For this purpose, provision can be made for the two first file surfaces 42 and the two second file surfaces 43 to be smoothed differently, in particular with different angles.

In the case of the embodiment according to FIGS. 33A and 33B, an elevation 67 is likewise provided. However, unlike in the case of the embodiment according to FIGS. 32A and 32B, the side walls of the elevation 67, which extend in continuation of the second file surfaces 43, do not converge at a longitudinal edge, but are connected together via a connecting surface 68. The connecting surface 68 extends parallel to the guide surface 41. The edge dimension x' of the connecting surface 68 is, as shown in FIG. 33B, much less than the edge dimension x of the guide surface 41. The edge dimension x' of the connecting surface 68 is preferably chosen to be so small that it is not possible to place the file 40 stably on the connecting surface 68. Preferably, the edge dimension x' is less than 3 mm. As a result, it is both visually discernible and also noticeable to the operator when the file 40 is placed incorrectly on the connecting surface 68 instead of on the guide surface 41.

FIGS. 34A and 34B show a file 40 in which the elevation 67 extends in a curved manner. As a result, it is not possible to stably place and guide the file 40 on the side 64 located opposite the guide surface 41. During placement on the side 64, the file 40 tips to the side. In the embodiment, the elevation is in the form of a continuous radius which extends from one to the opposite second file surface 43. The elevation 67 is realized so large that it is not possible to place the file 40 with the side 64 on the support surface 15. The elevation 67 is visually and haptically discernible to the operator and as a result forms an indication, with which the rotational position of the file 40 about its longitudinal center axis 51 is discernible.

Figure 35A:
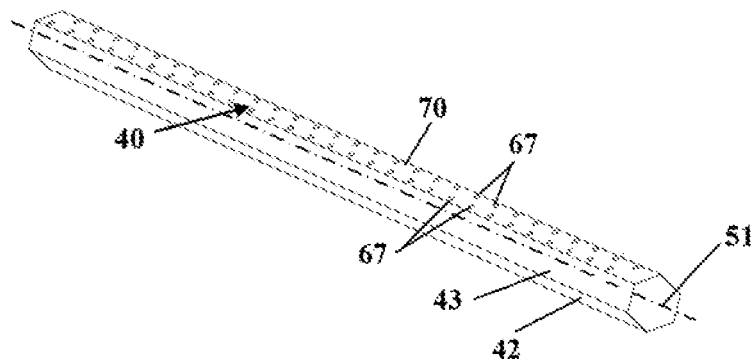
Figure 35B:
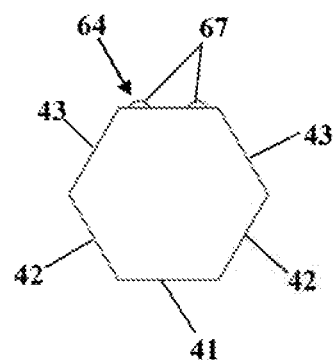

In the case of the embodiment according to FIGS. 35A and 35B, a file 40 is provided which has a multiplicity of elevations 67 on the side 64 located opposite the guide surface 41. Arranged between the elevations 67, as shown in FIG. 35A, are interruptions 70. The elevations 67 are arranged in two rows in the embodiment, the elevations 67 of the two rows advantageously being arranged with an offset with respect to one another in the direction of the longitudinal center axis 51. The elevations 67 accordingly do not extend continuously in the longitudinal direction 51 of the file 40. Apart from the elevations 67, the file 40, as shown in FIG. 35B, has the cross section of a regular hexagon. In cross sections in which interruptions 70 are arranged, the file 40 has the cross section of a regular hexagon. Upon placement on the side 64, the elevations 67 create a clattering noise and as a result form an acoustic indication of the rotational position of the file 40. The elevations 67 also form a visual and haptic indication. The elevations 67 constructively prevent the file 40 from being able to be guided stably on the side 64.

Figure 36A:
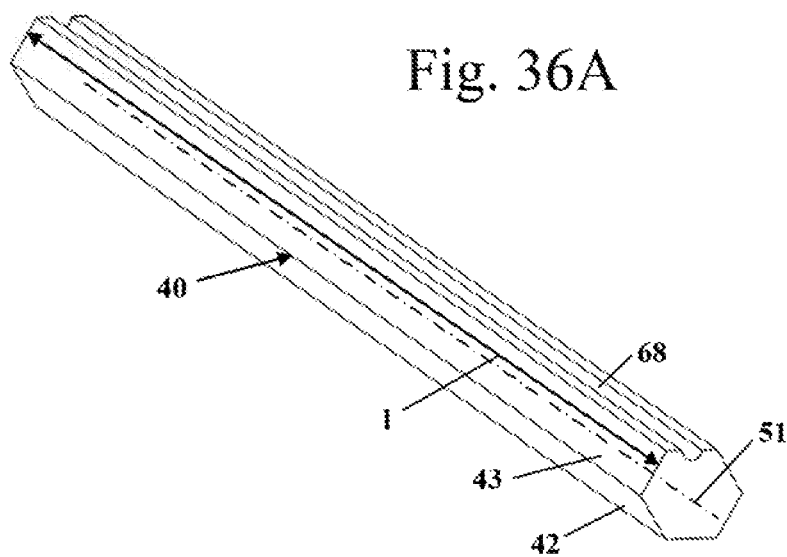
Figure 36B:
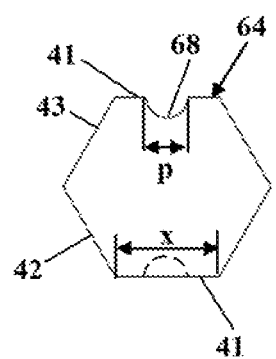

In the case of the embodiment according to FIGS. 36A and 36B, a file 40 is illustrated which has a recess 68 with respect to a hexagonal cross section on the side 64 located opposite one of the guide surfaces 41. The recess 68 also forms an indication, which indicates to the operator the rotational position of the file 40 about its longitudinal center axis 51. In this case, a guide surface 41 is realized on the side 64 too. The file 40 has two guide surfaces 41 located opposite one another, one of which, namely the guide surface 41 illustrated at the top in FIG. 36B, has a recess 68. In an alternative embodiment, which is illustrated by a dashed line in FIG. 36B, the second guide surface 41, illustrated at the bottom in FIG. 36B, also has a recess 68. In the case of this embodiment, the file 40 is realized preferably mirror-symmetrically to a plane extending centrally between the guide surfaces 41 and parallel to the guide surfaces 41.

The recess 68 is realized as a groove and extends along the entire length l of the first file surface 42 of the file 40 in the embodiment. As FIG. 36B shows, the recess 68 has a width p which is 0.2 to 0.8 times the edge dimension x. In the embodiment, a width p of about one third of the edge dimension x is provided. On both sides of the recess 68, the side 64 has sections that extend parallel to the guide surface 41. It can also be provided that the recess 68 extends only along a part of the length l of the first file surface 42 of the file 40 or that a plurality of recesses 68 are provided, which are separated from one another via interruptions.

Figure 37A:
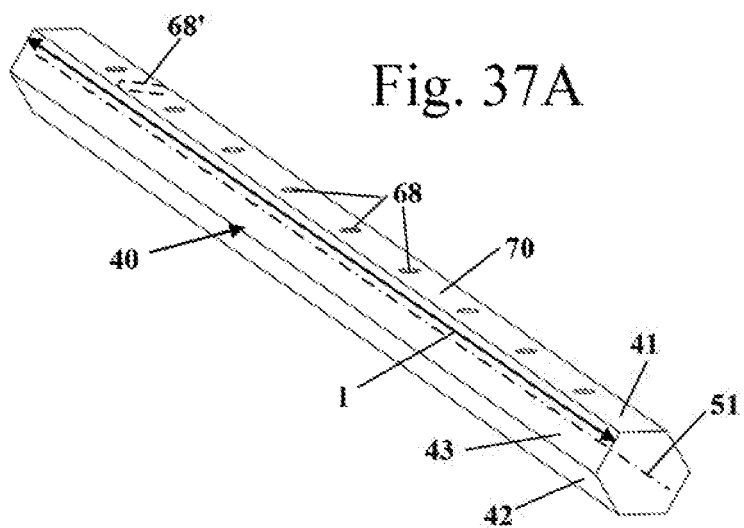
Figure 37B:
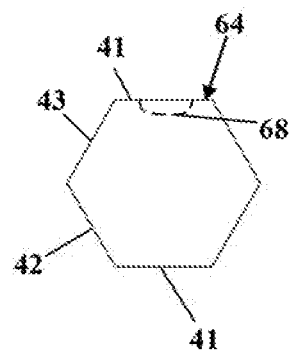

In the case of the embodiment according to FIGS. 37A and 37B, a multiplicity of recesses 68 are provided on the side 64, which are interrupted by interruptions 70 in the longitudinal direction of the file 40. The recesses 68 in this case extend in the longitudinal direction 51 along a much smaller portion of the length l of the first file surface 42 of the file 40 than the interruptions 70. In the region of the interruptions 70, the file 40 has a hexagonal cross section. The side 64 can likewise be realized as a guide surface 41. However, it can also be provided that the recesses 68 are configured such that the file 40 clatters upon placement on the side 64 and when the file 40 is moved over the cutting tooth 7 and thus provides tactile feedback to the operator indicating that a surface not intended for this purpose has been placed on the cutting tooth 7.

In an alternative configuration, the two guide surfaces 41 located opposite one another have recesses 68, which are preferably realized symmetrically to a plane extending between the guide surfaces 41. As a result, the file 40 is usable in two orientations rotated through 180° about its longitudinal center axis 51, that is, is turnable. The recesses 68 make it possible to readily distinguish the guide surfaces 41 visually from the file surfaces 42 and 43. Depending on the configuration of the recesses 68, the guide surfaces 41 can also be haptically distinguishable from the file surfaces 42 and 43. Provision can be made for the guide surfaces 41 to have different indications, for example differently arranged and/or realized recesses 68, such that the two guide surfaces 41 are also visually and/or haptically distinguishable from one another.

In a further alternative configuration, recesses 68' can be provided which extend over the entire width of the guide surface 41, the width p of the recesses 68' thus corresponding to the edge dimension x (FIG. 36B). Such a recess 68' is indicated schematically in FIG. 37A. Preferably, a plurality of recesses 68' are arranged such that the recesses 68' overlap in the direction of the longitudinal center axis 51. The recesses 68' can in this case be realized preferably in an elongate manner, the alignment of the longitudinal direction of the recesses 68' to the longitudinal center axis 51 being able to be chosen in a suitable manner.

In a further alternative configuration, rather than the recesses 68 or 68', elevations can be arranged in a corresponding manner on the side 64 located opposite the guide surface 41. In the case of elevations which extend over the entire width of the side 64 located opposite the guide surface 41, it is advantageously provided that the elevations are aligned in an inclined manner with respect to the longitudinal direction 51. The inclination angle of the elevations to the longitudinal direction 51 corresponds preferably to the angle δ (FIG. 7). In particular, an inclination angle of 20° to 70° is formed between the longitudinal direction of the elevation and the longitudinal center axis 51 of the file 40.

If the file 40 is incorrectly placed with the side 64 on the support surface 15 and the file 40 is guided in the sharpening direction 29 with respect to the cutting tooth 7, the elevation in this way strikes the basic body of the cutting tooth 7 with its longitudinal side, the user feeling this as a considerable resistance. As a result, the operator is able to feel when the side 64 having the elevations is incorrectly placed on the support surface 15.

In a particularly preferred configuration, the elevations or recesses 68' are aligned with their longitudinal direction parallel to the longitudinal direction, that is, to the running direction 21 of the saw chain 1 (FIG. 1) to be filed. As a result, via the elevations or recesses 68', the operator obtains not only information about the rotational position of the file 40 but also information about the intended alignment of the file 40 with respect to the saw chain 1 to be filed.

Figure 38A:
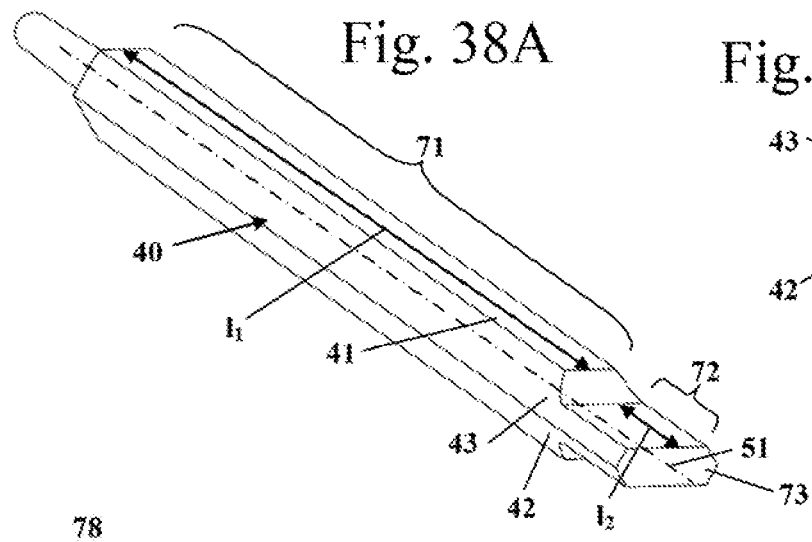
Figure 38B:
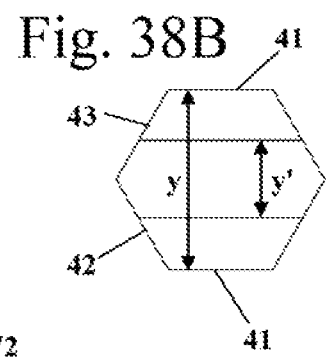

In the case of the embodiment according to FIGS. 38A and 38B, the file 40 is subdivided into two longitudinal sections 71 and 72 with different cross-sectional shapes. In the first longitudinal section 71, there extend two guide surfaces 41 that are arranged opposite one another, two first file surfaces 42 and two second file surfaces 43. In the embodiment, the file 40 has a regular hexagonal cross section in the first longitudinal section 71. The first longitudinal section 71 has a length $l_1$ measured in the direction of the longitudinal center axis 51. The second longitudinal section 72 has a length $l_2$ measured in the direction of the longitudinal center axis 51. The length $l_1$ is much greater than the length $l_2$. In the second longitudinal section 72, the file 40 is flattened on the guide surfaces 41 located opposite one another. The guide surfaces 41 have, in the second longitudinal section 72, a spacing y' from one another, which is much smaller than the spacing y of the guide surfaces 41 in the first longitudinal section 71. From the position of the flattened guide surfaces 41 in the second longitudinal section 72, the position of the guide surfaces 41 is visually discernible by the operator. The flattened guide surfaces 41 can serve at the same time as a support for the hand, in particular for an operator's thumb, resulting in ergonomic operation. In the embodiment, the second longitudinal section 72 is arranged between the first longitudinal section 71 and a free end 73 of the file 40. In the embodiment, the second longitudinal section 72 adjoins the free end 73 of the file 40. In an alternative embodiment, however, provision can also be made for the second longitudinal section 72 to be at a spacing from the free end 73.

Figure 39A:
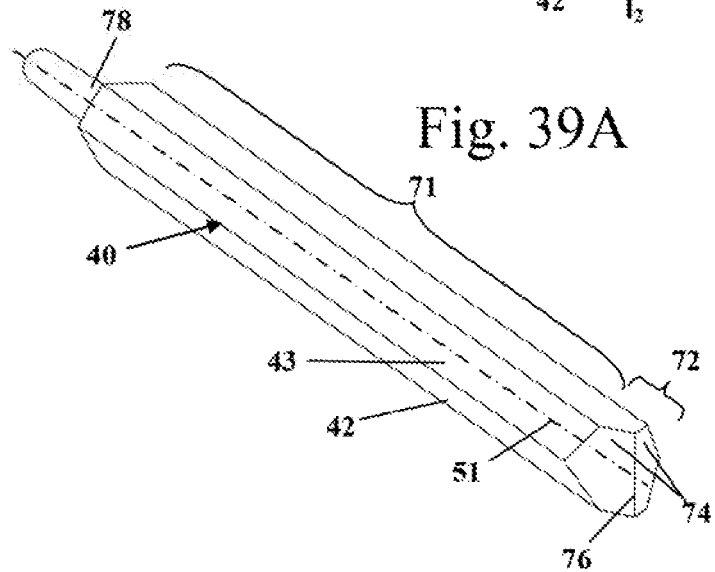
Figure 39B:
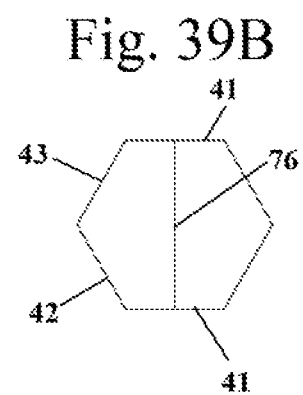

FIGS. 39A and 39B show a further embodiment of a file 40, which has a first longitudinal section 71 and a second longitudinal section 72. The second longitudinal section 72 is arranged between the first longitudinal section 71 and the free end 73 of the file 40. In the second longitudinal section 72, the file 40 has two surfaces 74 which are inclined with respect to the longitudinal direction 51. The inclination of the surfaces 74 with respect to the longitudinal center axis 51 of the file 40 corresponds preferably to the angle δ (FIG. 7) at which, during filing, the longitudinal center axis 51 of the file 40 is intended to be guided with respect to the running direction 21 of the saw chain 1. The surfaces 74 are realized in a planar manner in the embodiment. The surfaces 74 converge at an edge 76 in the embodiment. The edge 76 extends from one guide surface 41 to the opposite guide surface 41 and extends perpendicularly to the guide surfaces 41 in the embodiment. The edge 76 forms the free end 73 of the file 40. The edge 76 provides the operator with visual feedback as to where the guide surfaces 41 are arranged. At the same time, the edge 76 can be used as a replacement for a screwdriver for loosening and fastening a sprocket cover of a chainsaw.

Figure 40A:
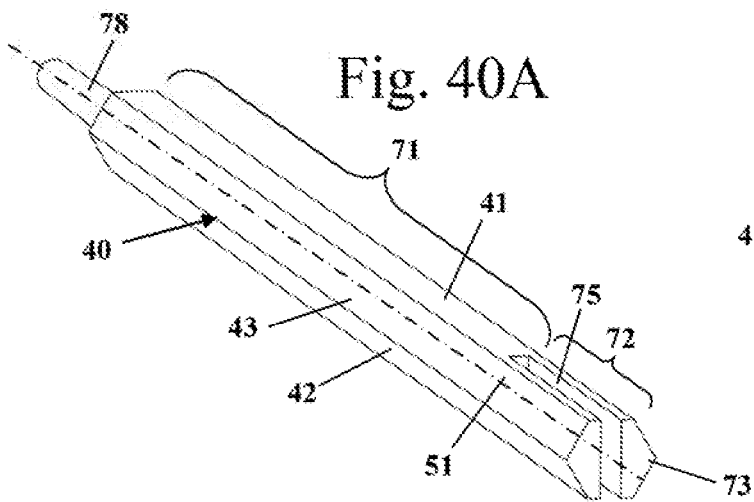
Figure 40B:
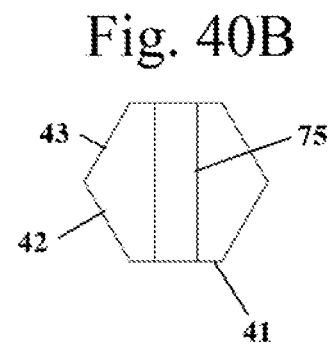

In the case of the embodiment according to FIGS. 40A and 40B, a longitudinal slot 75 is provided in the second longitudinal section 72. In the embodiment, the slot 75 extends in the longitudinal direction 51 and cuts the guide surfaces 41 centrally. The slot 75 provides visual feedback to the operator as to where the guide surfaces 41 are located. The slot 75 extends as far as the free end 73 of the file 40 in the embodiment. As the figures show, the file 40 has, at the opposite end from the free end 73, a connecting piece 78, which is provided for mounting in a handle of the file 40.

Figure 41A:
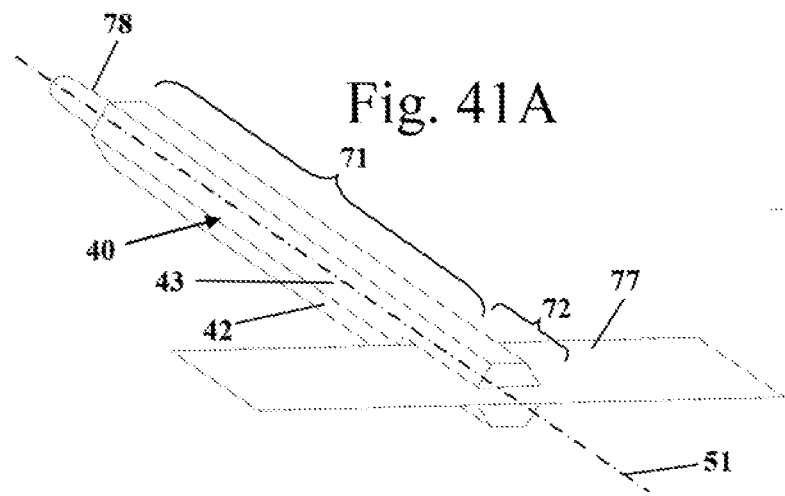
Figure 41B:
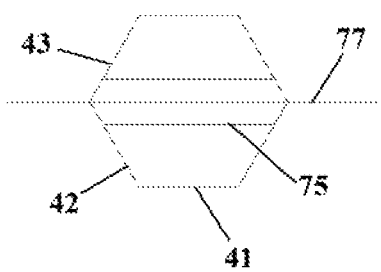

FIGS. 41A and 41B show a further embodiment of a file 40, which has two longitudinal sections 71 and 72. In the second longitudinal section 72, the file 40 has a longitudinal slot 75, which extends between the guide surfaces 41. The longitudinal slot 75 extends parallel to the guide surfaces 41 and centrally between the guide surfaces 41 in the embodiment. The longitudinal slot 75 visually indicates the position of the guide surfaces 41. At the same time, the longitudinal slot 75 can serve to receive a support 77, schematically illustrated in FIGS. 40A and 40B, for an operator's thumb.

Figure 42A:
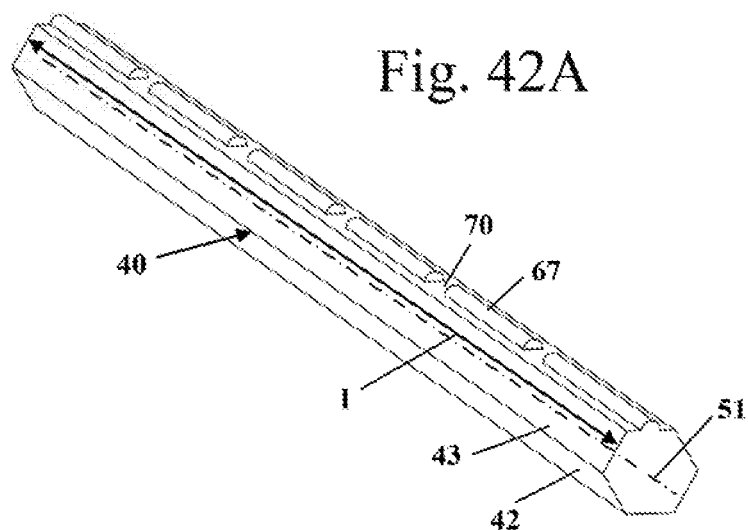
Figure 42B:
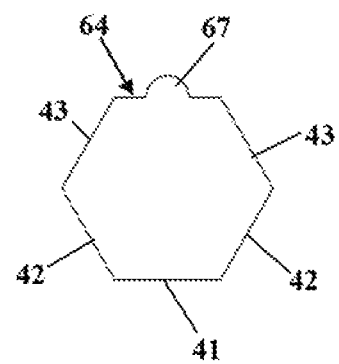

In the embodiment according to FIGS. 42A and 42B, a file 40 which on the side 64 disposed opposite to the guide surface 41 has at least one elevation 67 (a plurality of elevations 67 are shown in FIG. 42A). The at least one elevation 67 has an elongated shape and can preferably be formed as a bead or bulge. The at least one elevation 67 extends in the direction of the longitudinal center axis 51. Interruptions 70 are arranged between the plurality of elevations 67 provided in the embodiment as shown in FIG. 42A. Accordingly, the elevations 67 do not extend continuously over the entire length l in the longitudinal direction 51 of the file. In an alternative embodiment an elevation 67 is provided which is configured as a continuous bead or bulge and extends over a majority, in particular over the entirety of the length l. Sections which extend parallel to the guide surface 41 are provided on both sides of the elevation 67, as shown in cross section in FIG. 42B. Excluding the elevation 67 the file 40 has the cross section of a regular hexagon, as shown in FIG. 42B. In cross sections in which the interruptions 70 are arranged, the file 40 has a cross section of a regular hexagon.

The embodiments, illustrated in FIGS. 32A to 42B, with a cross section that differs from the regular hexagonal cross section allow an operator to visually or haptically identify the position of the guide surfaces 41 better. Alternatively or additionally, a visual indication of a guide surface 41 and/or of the side 64 located opposite a guide surface 41 can be provided. Such a visual indication can be for example a laser marking, an impression or an imprint. Preferably, the marking also provides information about the correct position of the file 40 with respect to the saw chain 1. For example, the indication can be aligned in the longitudinal direction of a saw chain 1 to be filed, that is, at a specified angle to the longitudinal direction 51 of the file 40.

Figure 43:
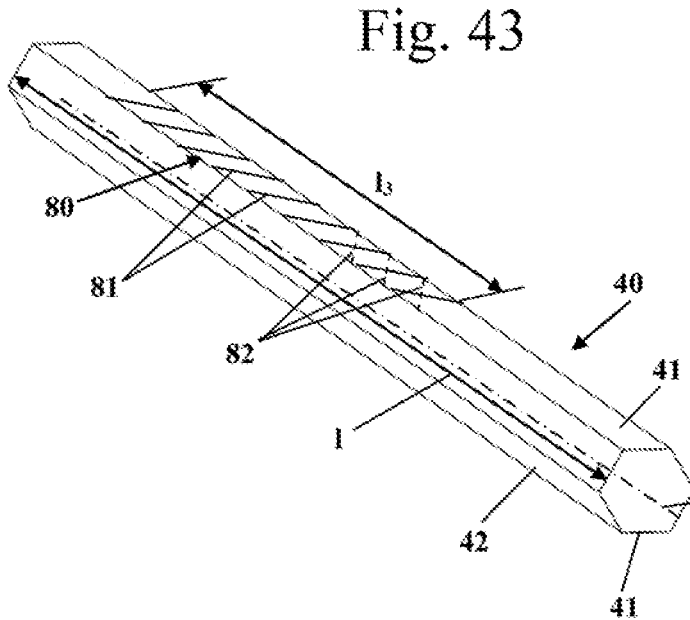
FIG. 43 shows a schematic perspective illustration of a further embodiment of a file; and, FIG. 44 shows a schematic illustration of a further embodiment of a file in cross section.

Such an indication 80 is illustrated schematically in FIG. 43. The indication 80 extends along a length $l_3$ of the file 40, which corresponds to at least 30%, in particular at least 50%, preferably at least 80% of the length l of the first file surface 42. Particularly preferably, the indication 80 extends along a length $l_3$ which corresponds to the entire length l of the first file surface 42. In the embodiment, the indication 80 is formed by a multiplicity of lines 81. The lines 81 extend in an inclined manner with respect to the longitudinal center axis 51 in the embodiment. Preferably, the angle between the lines 81 and the longitudinal center axis 51 corresponds to the angle δ (FIG. 7) at which, during the filing operation, the longitudinal center axis 51 is intended to be guided with respect to the running direction 21 of the saw chain 1.

In an alternative configuration, the indication 80 can be formed by lines 81 and lines 82. The lines 82 are illustrated schematically by dashed lines in FIG. 43. The lines 81 and lines 82 are inclined inversely with respect to the longitudinal center axis 51. Preferably, the lines 81 and 82 cross, such that a diamond pattern arises. The spacing between adjacent lines 81 and between adjacent lines 82 is preferably much greater than the spacing between adjacent strokes of the file surfaces 42 or 43, such that the guide surfaces 41 can be visually distinguished readily from the file surfaces 42 and 43.

The lines 81 and 82 can have been applied as a marking to the file 40. In a preferred configuration, the lines 81 and 82 are realized as flutes or as elevations, however. The lines 81 and 82 can have been cut in for example by means of a laser.

Figure 44:
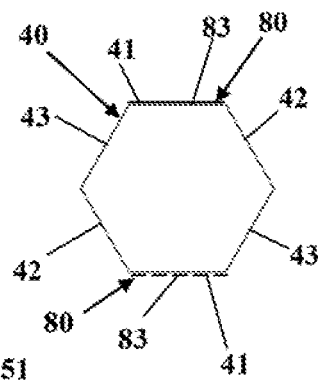

A visual indication can also be a colored coating, a polished surface, a chromed surface or the like. As a result of a colored coating with a paint that reduces the coefficient of friction, the polishing or chroming, a reduction in the friction is achieved at the same time. Such an indication is applied preferably to the guide surface 41 such that the friction during filing is reduced. An arrangement of such a marking on the side 64 located opposite the guide surface 41 can also be advantageous, however. This is illustrated schematically in FIG. 44. The file 40 illustrated in cross section in FIG. 44 has two oppositely situated guide surfaces 41. Applied to one guide surface 41 is an indication 80 in the form of a coating 83. Optionally, an indication 80 in the form of a coating 83 can also be applied to the opposite guide surface 41. This is indicated in FIG. 44 by a dashed line. The indication 80 extends preferably along at least 30%, in particular along at least 50%, particularly preferably along at least 80% of the length l of the first file surface 42. In a particularly preferred configuration, the indication 80 extends along a length which corresponds to the length l of the first file surface 42. The length of the indication 80 is chosen such that the indication 80 can be visually perceived easily by the operator even under unfavorable light conditions.

In an alternative configuration, it is provided that the guide surface 41 is tempered in an inductive hardening process, resulting in a blue coloration of the guide surface 41. At the same time, the wear to the guide surface 41 is reduced on account of the increased hardness.

Advantageously, the indication is realized such that it forms both a visually readily discernible indicator of the rotational position for the operator and also has a technical effect. In the case of an indication realized as a coating, the technical effect is advantageously a reduction in the friction between the file 40 and cutting tooth 7. In the case of an indication realized as an elevation, the elevation is advantageously formed such that placement of the file 40 on the support surface 15 of a cutting tooth 7 on the side provided with the at least one elevation is apparent to the operator. This can be for example unstable placement or the creation of clattering during the filing operation. Elevations or recesses at the same time reduce the inclination of the guide surface 41 to soiling, since contaminants are conveyed into the recesses or between the elevations during filing.

It is understood that the foregoing description is that of the preferred embodiments of the invention and that various changes and modifications may be made thereto without departing from the spirit and scope of the invention as defined in the appended claims.

What is claimed is:

1. A file for filing a saw tooth of a saw chain, the file comprising:
a file body defining a circumferential direction and a circumference;
said file body, in a cross section, having an unhewn guide surface and a file surface adjoining said unhewn guide surface in the circumferential direction;
said unhewn guide surface extending over at least ⅙ of said circumference in said cross section, wherein: said file surface is a first file surface; said file body has a second file surface adjoining said first file surface in the circumferential direction; and, said first file surface, said second file surface, and said unhewn guide surface are realized in a straight manner in cross section;
said file body further defining a longitudinal center axis;
said first file surface defining a length (1); and,
said file body having, along at least 30% of said length (1) of said first file surface, an indicator which indicates a rotational position of said file body about said longitudinal center axis.

2. The file of claim 1, wherein:
said file body has a width (w) measured parallel to said unhewn guide surface; and,
said width (w), in at least one region of said cross section, increases with increasing distance from said unhewn guide surface.

3. The file of claim 1, wherein:
said unhewn guide surface and said first file surface conjointly enclose a first angle ($\alpha'$) of greater than 90°; and,
said unhewn guide surface and said second file surface conjointly enclose a second angle ($\beta'$) of less than 90°.

4. The file of claim 1, wherein:
said file body has a first side disposed opposite to said unhewn guide surface;
said unhewn guide surface has a first edge dimension; and,
said first side has a second edge dimension which differs from said first edge dimension.

5. The file of claim 4, wherein said second edge dimension is less than said first edge dimension.

6. The file of claim 1, wherein:
said file body has a first side disposed opposite to said unhewn guide surface; and,
said first side defines a shape which differs in at least one cross section from a profile parallel to said unhewn guide surface.

7. The file as claimed in claim 6, wherein said first side of said file body has at least one elevation.

8. The file of claim 6, wherein said first side has at least one recess.

9. The file of claim 1, wherein said unhewn guide surface is interrupted by at least one recess.

10. The file of claim 1, wherein:
said file surface is a first file surface;
said file body has a second file surface adjoining said first file surface in the circumferential direction;
said file body has a first longitudinal section which includes said first file surface, said second file surface and said unhewn guide surface;
said first longitudinal section defines a first cross section; and,
said file body has a second longitudinal section defining a second cross section which differs from said first cross section.

11. The file of claim 10, wherein:
said file body has a free end; and,
said second longitudinal section is arranged between said first longitudinal section and said free end of said file body.

12. The file of claim 10, wherein the file body has, in said second longitudinal section, a flattened cross section on at least one side compared to said first cross section.

13. The file of claim 12, wherein the file is realized in a flattened manner on at least one guide surface in said second longitudinal section.

14. The file of claim 10, wherein the file has, in said second longitudinal section, at least one surface that is inclined with respect to the longitudinal direction.

15. The file of claim 10, wherein the file body defines a longitudinal slot in said second longitudinal section.

16. The file of claim 1, wherein said indicator extends over the entirety of said unhewn guide surface along at least 30% of the length (1) of the first file surface.

17. The file of claim 1, wherein:
said file body has a first side disposed opposite to said unhewn guide surface; and,
said indicator extends over the entirety of said first side along at least 30% of the length (1) of the first file surface.

* * * * *